United States Patent
Tian et al.

(10) Patent No.: US 8,057,711 B2
(45) Date of Patent: Nov. 15, 2011

(54) COMPOSITE COMPOUND WITH MIXED CRYSTALLINE STRUCTURE

(75) Inventors: Ye Tian, Shenzhen (CN); Tangli Cheng, Shenzhen (CN); Xiaobing Xi, Shenzhen (CN)

(73) Assignee: BYD Company Limited (CN)

( * ) Notice: Subject to any disclaimer, the term of this patent is extended or adjusted under 35 U.S.C. 154(b) by 375 days.

(21) Appl. No.: 12/316,180

(22) Filed: Dec. 9, 2008

(65) Prior Publication Data
US 2009/0220856 A1    Sep. 3, 2009

Related U.S. Application Data

(63) Continuation-in-part of application No. 12/040,773, filed on Feb. 29, 2008.

(51) Int. Cl.
*H01B 1/02*    (2006.01)

(52) U.S. Cl. .............. 252/519.1; 252/182.1; 252/506; 252/510; 252/519.15; 29/623.1; 429/52; 429/218.1; 429/220; 429/224; 429/231.95; 429/232

(58) Field of Classification Search .......... 252/500, 252/182.1, 506, 510, 519.1, 519.15; 429/218.1, 429/224, 231.95, 232, 52, 220; 29/623.1
See application file for complete search history.

(56) References Cited

U.S. PATENT DOCUMENTS

| | | |
|---|---|---|
| 3,778,307 A | 2/1968 | Beer et al. |
| 4,394,280 A | 7/1983 | von Alpen et al. |
| 5,910,382 A * | 6/1999 | Goodenough et al. ..... 429/218.1 |
| 6,514,640 B1 | 2/2003 | Armand et al. |
| 6,534,216 B1 * | 3/2003 | Narukawa et al. ............ 429/224 |
| 6,558,844 B2 | 5/2003 | Howard, Jr. et al. |
| 6,645,452 B1 | 11/2003 | Barker et al. |
| 6,702,961 B2 | 3/2004 | Barker et al. |
| 6,835,500 B2 | 12/2004 | Masquelier et al. |
| 6,960,331 B2 | 11/2005 | Barker et al. |
| 6,964,830 B2 | 11/2005 | Takahashi |
| 7,025,907 B2 | 4/2006 | Kohzaki et al. |
| 7,172,834 B1 | 2/2007 | Jow et al. |
| 7,189,475 B2 | 3/2007 | Sasaki et al. |
| 7,255,965 B2 | 8/2007 | Xu et al. |
| 7,261,979 B2 | 8/2007 | Gozdz et al. |
| 7,338,734 B2 | 3/2008 | Chiang et al. |
| 7,722,848 B2 | 5/2010 | Dai et al. |
| 7,824,802 B2 * | 11/2010 | Zhang et al. .............. 429/218.1 |
| 2002/0047112 A1 | 4/2002 | Hosoya et al. |
| 2002/0102459 A1 | 8/2002 | Hosoya et al. |
| 2003/0064287 A1 | 4/2003 | Masquelier et al. |

(Continued)

FOREIGN PATENT DOCUMENTS

CA    2510880 A1 *    1/2007

(Continued)

OTHER PUBLICATIONS

European Search Report for EP09400001 (mailed Apr. 14, 2009).

(Continued)

*Primary Examiner* — Khanh Tuan Nguyen
(74) *Attorney, Agent, or Firm* — Greenberg Traurig, LLP

(57) ABSTRACT

A composite lithium compound having a mixed crystalline structure is provided. Such compound can be formed by heating a lithium, iron, phosphorous and carbon mixed compound with another metal compound together. The resulting mixed metal crystal can exhibit superior electrical property and is a better cathode material for lithium secondary batteries.

15 Claims, 9 Drawing Sheets

U.S. PATENT DOCUMENTS

| | | | |
|---|---|---|---|
| 2003/0215714 A1 | 11/2003 | Barker et al. | |
| 2004/0029011 A1* | 2/2004 | Ravet et al. | 429/231.95 |
| 2004/0151649 A1 | 8/2004 | Hemmer et al. | |
| 2004/0253518 A1* | 12/2004 | Hosoya et al. | 429/232 |
| 2005/0233220 A1 | 10/2005 | Gozdz et al. | |
| 2006/0083900 A1 | 4/2006 | Ashraf | |
| 2006/0236528 A1 | 10/2006 | Xu et al. | |
| 2007/0160752 A1 | 7/2007 | Mao | |
| 2007/0166609 A1 | 7/2007 | Lee et al. | |
| 2007/0178370 A1 | 8/2007 | Amine et al. | |
| 2007/0184352 A1 | 8/2007 | Donoue et al. | |
| 2007/0207080 A1 | 9/2007 | Yang | |
| 2007/0212606 A1 | 9/2007 | Chang | |
| 2009/0081102 A1 | 3/2009 | Dai et al. | |
| 2009/0106970 A1 | 4/2009 | Fan et al. | |
| 2009/0148765 A1 | 6/2009 | Cao et al. | |
| 2009/0169984 A1 | 7/2009 | Liang et al. | |
| 2009/0191455 A1 | 7/2009 | Gao et al. | |
| 2009/0217512 A1 | 9/2009 | Tian et al. | |
| 2009/0217513 A1 | 9/2009 | Xi et al. | |
| 2009/0220858 A1 | 9/2009 | Cheng et al. | |
| 2009/0220860 A1 | 9/2009 | Xi et al. | |
| 2009/0302283 A1 | 12/2009 | Xia et al. | |
| 2010/0028771 A1 | 2/2010 | Zhou et al. | |
| 2010/0059706 A1 | 3/2010 | Dai et al. | |
| 2010/0062339 A1 | 3/2010 | Pan et al. | |

FOREIGN PATENT DOCUMENTS

| | | |
|---|---|---|
| CN | 1259773 | 7/2000 |
| CN | 1401559 | 3/2003 |
| CN | 1410349 | 4/2003 |
| CN | 1424980 | 6/2003 |
| CN | 1559889 | 1/2005 |
| CN | 1641912 | 7/2005 |
| CN | 1648036 | 8/2005 |
| CN | 1677718 | 10/2005 |
| CN | 1762798 | 4/2006 |
| CN | 1773754 | 5/2006 |
| CN | 1775665 | 5/2006 |
| CN | 1797823 | 7/2006 |
| CN | 1964125 | 5/2007 |
| CN | 1986395 | 6/2007 |
| CN | 1989649 | 6/2007 |
| CN | 101047268 | 10/2007 |
| CN | 101087021 | 12/2007 |
| CN | 101106189 | 1/2008 |
| CN | 101128950 | 2/2008 |
| CN | 101207197 | 6/2008 |
| CN | 101209827 | 7/2008 |
| CN | 101212048 | 7/2008 |
| CN | 101399343 | 4/2009 |
| CN | 101420048 | 4/2009 |
| CN | 101453019 | 6/2009 |
| CN | 101471432 | 7/2009 |
| CN | 101478041 | 7/2009 |
| CN | 101494305 | 7/2009 |
| EP | 1553647 | 7/2005 |
| EP | 1855334 | 11/2007 |
| WO | 9740541 | 10/1997 |
| WO | 2005076936 | 8/2005 |
| WO | 2006066470 | 6/2006 |
| WO | 2006112674 | 10/2006 |
| WO | 2008109734 | 9/2008 |

OTHER PUBLICATIONS

Hu, Huan-yu et al., "Influenece of the Mg-substitution on electrochemical performances of LiFePO4," China Academic Journal Electronic Publishing House, pp. 18-20, vol. 30, No. 1, 2006.

Related U.S. Appl. No. 12/035,978, entitled "Lithium Iron Phosphate Cathode Material ," Non-Final Office Action (mailed Apr. 27, 2009).
Related U.S. Appl. No. 12/035,978, entitled "Lithium Iron Phosphate Cathode Material ," Non-Final Office Action (mailed Oct. 2, 2008).
Related U.S. Appl. No. 12/035,978, entitled "Lithium Iron Phosphate Cathode Material," Final Office Action (mailed Jan. 9, 2009).
Related U.S. Appl. No. 12/127,431, entitled "Lithium Iron-Phosphate Cathode Material," Final Office Action (mailed Jun. 26, 2009).
Related U.S. Appl. No. 12/127,431, entitled "Lithium Iron-Phosphate Cathode Material," Non-Final Office Action (mailed Jan. 30, 2009).
Yun et al., "Synthesis and electrochemcial properties of olivine-type LiFe PO4/C composite cathode material prepared from a poly(vinyl alcohol)-containg precursor." Journal of Power Sources vol. 160, issue 2, Oct. 2006, pp. 1361-1368 (Available online May 9, 2006).
USPTO Transaction History of related U.S. Appl. No. 12/035,978, filed Feb. 22, 2008, entitled "Lithium Iron Phosphate Cathode Material."
USPTO Transaction History of related U.S. Appl. No. 12/040,773, filed Feb. 29, 2008, entitled "Composite Compound with Mixed Crystalline Structure."
USPTO Transaction History of related U.S. Appl. No. 12/053,308, filed Mar. 21, 2008, entitled "Cathode Materials for Lithium Batteries."
USPTO Transaction History of related U.S. Appl. No. 12/127,431, filed May 27, 2008, entitled "Lithium Iron Phosphate Cathode Material."
USPTO Transaction History of related U.S. Appl. No. 12/198,087, filed Aug. 25, 2008, entitled "Lithium-Ion Rechargeable Battery Preparation."
USPTO Transaction History of related U.S. Appl. No. 12/254,537, filed Oct. 20, 2008, entitled "Lithium Iron(11) Phosphate Cathode Active Material."
USPTO Transaction History of related U.S. Appl. No. 12/273,649, filed Nov. 19, 2008, entitled "Composite Separator Films for Lithium-Ion Batteries."
USPTO Transaction History of related U.S. Appl. No. 12/316,165, filed Dec. 9, 2008, entitled "Composite Compound with Mixed Crystalline Structure."
USPTO Transaction History of related U.S. Appl. No. 12/316,173, filed Dec. 9, 2008, entitled "Composite Compound with Mixed Crystalline Structure."
USPTO Transaction History of related U.S. Appl. No. 12/316,234, filed Dec. 9, 2008, entitled "Composite Compound with Mixed Crystalline Structure."
USPTO Transaction History of related U.S. Appl. No. 12/352,981, filed Jan. 13, 2009, entitled "Electrolyte for Batteries and Battery Packs."
USPTO Transaction History of related U.S. Appl. No. 12/436,347, filed May 6, 2009, entitled "Transition Metal Hydroxide and Oxide, Method of Producing the Same, and Cathode Material Containing the Same."
USPTO Transaction History of related U.S. Appl. No. 12/482,690, filed Jun. 11, 2009, entitled "Electrolyte for Lithium Batteries."
Related U.S. Appl. No. 12/035,978, entitled "Lithium Iron Phosphate Cathode Material," Final Office Action (mailed Dec. 7, 2009).
Pei, Su-hua et al., "Sensitivity of $TiO^2$ : NB2O5 composite crystalliod to trimethylamine", Journal of Functional Materials and Devices, vol. 12, No. 3, Jun. 2006.
International Patent Application Serial No. PCT/CN08/70391, International Search Report and Written Opinion (mailed Jul. 17, 2008).
U.S. Appl. No. 12/127,431, entitled "Lithium Iron-Phosphate Cathode Material," Non-Final Office Action (mailed Oct. 20, 2009).

* cited by examiner

COMPOSITE COMPOUND WITH MIXED CRYSTALLINE STRUCTURE

CROSS-REFERENCE TO RELATED APPLICATION

This application is a continuation-in-part of co-pending U.S. patent application Ser. No. 12/040,773 filed Feb. 29, 2008, which is incorporated herein by reference in its entirety for all purposes.

FIELD OF THE INVENTION

The embodiments of the present invention relate to lithium secondary batteries, more specifically, to a composite compound having a mixed crystalline structure that can be used as a cathode material for lithium secondary batteries.

BACKGROUND

Lithium secondary batteries are widely used in various devices such laptops, cameras, camcorders, PDAs, cell phones, iPods and other portable electronic devices. These batteries are also growing in popularity for defense, automotive and aerospace applications because of their high energy density.

Lithium phosphate-based cathode materials for secondary battery have long been known in the battery industry. People have used metal intercalation compound to improve the electrical property of lithium phosphate. One popular intercalation compound is lithium iron phosphate ($LiFePO_4$). Because of its non-toxicity, excellent thermal stability, safety characteristics and good electrochemical performance, there is a growing demand for rechargeable lithium secondary batteries with $LiFePO_4$ as the cathode material.

$LiFePO_4$ has its problems as a cathode material, however. Compared with other cathode materials such as lithium cobaltate, lithium nicklate, and lithium magnate, $LiFePO_4$ has much lower conductance and electrical density. The current invention solves the problem by producing a mixed crystal structure to significantly enhance the electrical properties of $LiFePO_4$.

A mixed crystal can sometimes be referred to as a solid solution. It is a crystal containing a second constituent, which fits into and is distributed in the lattice of the host crystal. See IUPAC Compendium of Chemical Terminology 2nd Edition (1997). Mixed crystals have been used in semiconductors for enhancing light output in light emitting diodes (LEDs). They have also been used to produce sodium-based electrolyte for galvanic elements. The current invention is the first time that a mixed crystal has been successfully prepared for lithium metal intercalation compounds such as $LiFePO_4$. It is also the first time that a mixed crystalline structure has been used as a cathode material for lithium secondary batteries. The new cathode material disclosed in the present invention has significantly better electrical properties than traditional $LiFePO_4$ cathode materials.

SUMMARY

Accordingly, a first embodiment discloses a cathode active material comprising a mixed crystal, the mixed crystal having: a first crystalline substance having one or more members with the general formulas $Li_xM_y(XO_4)_z$, $LiMXO_5$, $LiMXO_6$ and $LiMX_2O_7$, wherein: $0<x/z\leq1$ and $0\leq y/z\leq1$; M is selected from elements Na, Mn, Fe, Co, Ni, Ti, Nb and V; X is selected from elements P, S, As, Mo and W; and a second crystalline substance having one or more members with the general formula $A_aM_bN_cO_d$, wherein: A, M and N are different metals selected from groups IIA, IIIA, IVA, VA, IB, IIB, IIIB, IVB, VB, VIB, VIIB and VIII of the periodic table; $0\leq a\leq6$, $0\leq b\leq6$, $0<c\leq6$ and $0<d\leq12$; and wherein a and b cannot both be 0 at the same time.

The material is capable of achieving electrical conductivity of about 0.01 to 10 S/cm at about 25° C. The first crystalline substance and the second crystalline substance has molar ratios of about 1 to 0.01-0.05. The first crystalline substance includes one or more members selected from the group consisting of $LiFePO_4$, $LiMnPO_4$, $LiCoPO_4$, $Li_3Fe_2(PO_4)_3$, $LiTi_2(PO_4)_3$, $Li_3V_2(PO_4)_3$, $Li_2NaV_2(PO_4)_3$, $LiTiPO_5$, $LiVMoO_6$, $LiVWO_6$, $LiVP_2O_7$ and $LiFeAs_2O_7$; and wherein the second crystalline substance includes one or more members selected from the group consisting of $Bi_4Ti_3O_{12}$, $CuNb_2O_6$, $MnTaO_4$, $FeWO_4$, $ZnZrNb_2O_8$, $NiNb_2O_6$, $NiZrNb_2O_8$, $FeTiNb_2O_8$, $MnTiNb_2O_8$, $MgSnNb_2O_8$, $ZnTa_2O_6$, $Cu_{0.85}Zn_{0.15}Nb_2O_6$, $YBa_3Ti_2O_{8.5}$, $Zr_{0.75}Ti_{0.75}Sn_{0.5}O_4$, $HfTiO_4$ and $MgNb_2O_6$.

The material further includes a carbon additive, wherein the carbon additive is capable of providing the mixed crystal with about 1-5% of carbon by weight. The carbon additive includes one or more members selected from the group consisting of carbon black, acetylene black, graphite, glucose, sucrose, citric acid, starch, dextrin and polyethylene glycol.

A second embodiment discloses a cathode active material comprising a mixed crystal, the mixed crystal having: a first crystalline substance having a combination of lithium, iron and phosphorous sources, wherein the lithium, iron and phosphorous (Li:Fe:P) sources have molar ratios of about 0.95-1.1:1:0.95-1.1; and a second crystalline substance having one or more members with the general formula $A_aM_bN_cO_d$, wherein: A, M and N are different metals selected from groups IIA, IIIA, IVA, VA, IB, IIB, IIIB, IVB, VB, VIB, VIIB and VIII of the periodic table; $0\leq a\leq6$, $0\leq b\leq6$, $0<c\leq6$ and $0<d\leq12$; and wherein a and b cannot both be 0 at the same time.

The material is capable of achieving electrical conductivity of about 0.01 to 10 S/cm at about 25° C. The phosphorous source and the second crystalline substance has molar ratios of about 1 to 0.01-0.05, taking only the phosphorous source in the material into consideration. The second crystalline substance includes one or more members selected from the group consisting of $Bi_4Ti_3O_{12}$, $CuNb_2O_6$, $MnTaO_4$, $FeWO_4$, $ZnZrNb_2O_8$, $NiNb_2O_6$, $NiZrNb_2O_8$, $FeTiNb_2O_8$, $MnTiNb_2O_8$, $MgSnNb_2O_8$, $ZnTa_2O_6$, $Cu_{0.85}Zn_{0.15}Nb_2O_6$, $YBa_3Ti_2O_{8.5}$, $Zr_{0.75}Ti_{0.75}Sn_{0.5}O_4$, $HfTiO_4$ and $MgNb_2O_6$. The lithium source includes one or more members selected from the group consisting of lithium carbonate, lithium hydroxide, lithium oxalate and lithium acetate; the iron source includes one or more members selected from the group consisting of ferrous oxalate, ferrous carbonate, iron acetate, iron oxide, iron phosphate, iron pyrophosphate and iron nitrate; and the phosphate source includes one or more members selected from the group consisting of ammonium phosphate, ammonium dihydrogen phosphate, ammonium, iron phosphate, phosphoric acid and lithium dihydrogen phosphate.

The material further includes a carbon additive, wherein the carbon additive is capable of providing the mixed crystal with about 1-5% of carbon by weight. The carbon additive includes one or more members selected from the group consisting of carbon black, acetylene black, graphite, glucose, sucrose, citric acid, starch, dextrin and polyethylene glycol.

A third embodiment discloses a cathode active material comprising a mixed crystal, the mixed crystal having: a first crystalline substance having one or more members selected from the group consisting of $LiFePO_4$, $LiMnPO_4$, $LiCoPO_4$, $Li_3Fe_2(PO_4)_3$, $LiTi_2(PO_4)_3$, $Li_3V_2(PO_4)_3$, $Li_2NaV_2(PO_4)_3$, $LiTiPO_5$, $LiVMoO_6$, $LiVWO_6$, $LiVP_2O_7$ and $LiFeAs_2O_7$; and a second crystalline substance having one or more members selected from the group consisting of $Bi_4Ti_3O_{12}$, $CuNb_2O_6$, $MnTaO_4$, $FeWO_4$, $ZnZrNb_2O_8$, $NiNb_2O_6$, $NiZrNb_2O_8$, $FeTiNb_2O_8$, $MnTiNb_2O_8$, $MgSnNb_2O_8$, $ZnTa_2O_6$, $Cu_{0.85}Zn_{0.15}Nb_2O_6$, $YBa_3Ti_2O_{8.5}$, $Zr_{0.75}Ti_{0.75}Sn_{0.5}O_4$, $HfTiO_4$ and $MgNb_2O_6$.

The material is capable of achieving electrical conductivity of about 0.01 to 10 S/cm at about 25° C. The material further includes a carbon additive, wherein the carbon additive is capable of providing the mixed crystal with about 1-5% of carbon by weight. The carbon additive includes one or more members selected from the group consisting of carbon black, acetylene black, graphite, glucose, sucrose, citric acid, starch, dextrin and polyethylene glycol.

In other embodiments, batteries may be manufactured using the cathode materials as described in the previously disclosed embodiments.

Other variations, embodiments and features of the present invention will become evident from the following detailed description, drawings and claims.

DETAILED DESCRIPTION

Figure 1:
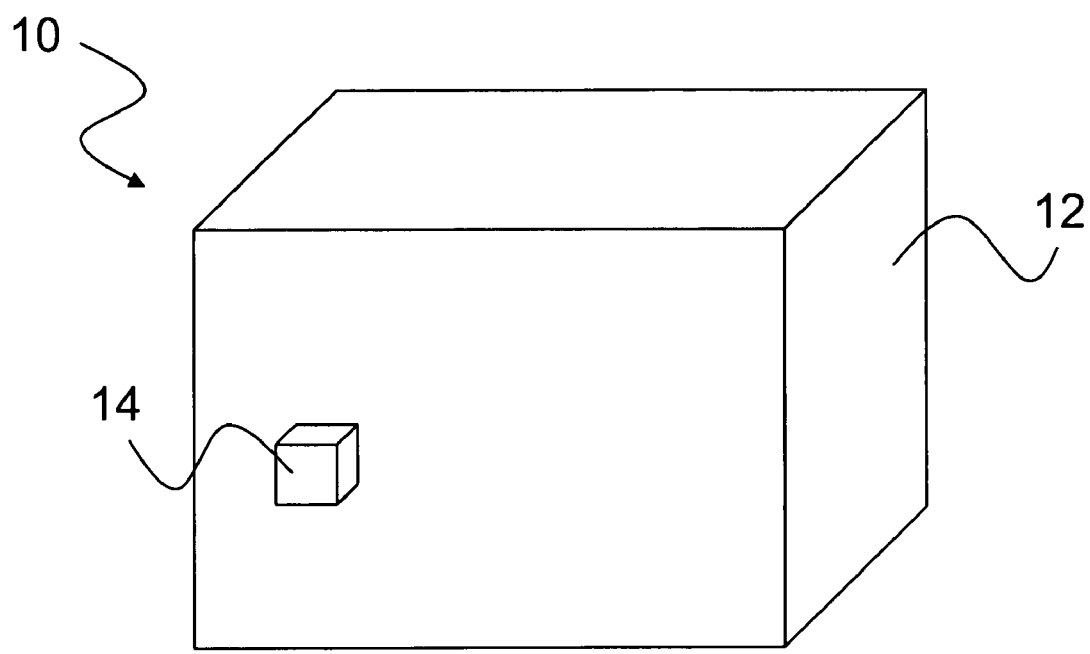
FIGS. 1-4 illustrate structural relationships of a mixed crystal, specifically, between a lithium iron phosphate compound and a composite metal compound.

It will be appreciated by those of ordinary skill in the art that the invention can be embodied in other specific forms without departing from the spirit or essential character thereof. The presently disclosed embodiments are therefore considered in all respects to be illustrative and not restrictive.

A cathode material for lithium secondary batteries can be provided by combining at least one lithium metal compound with at least one mixed metal crystal, wherein the lithium metal compound has an olivine structure and the mixed metal crystal includes a mixture of metal elements and metal oxides.

A general formula for a mixed crystal compound can be expressed as:

$Li_aA_{1-y}B_y(XO_4)_b/M_cN_d$, wherein:

A includes one or more transition metals from the first row including without limitation Fe, Mn, Ni, V, Co and Ti;

B includes one or more doped metals including without limitation Fe, Mn, Ni, V, Co, Ti, Mg, Ca, Cu, Nb, Zr and other rare earth elements or metals;

X includes one or more members of P, Si, S, V and Ge;

M includes one or more metals selected from groups IA, IIA, IIIA, IVA, VA, IIIB, IVB and VB of the periodic table;

N includes one or more members of O, N, H, S, $SO_4$, $PO_4$, OH, Cl and fluorine-related elements; and $0 < a \leq 1$, $0 \leq y \leq 0.5$, $0 < b \leq 1$, $0 < c \leq 4$ and $0 < d \leq 6$.

The mixed crystal compound includes a lithium compound $[Li_aA_{1-y}B_y(XO_4)_b]$ portion and a metal compound $M_cN_d$ portion having a mixed crystalline relationship, with the lithium compound serving as the backbone or main building block of the cathode material. In one instance, the metal compound can be distributed into the lithium compound to provide a composite compound or a mixed crystal.

The cathode material may also include doped carbon additives, e.g., the mixed crystal compound $Li_aA_{1-y}B_y(XO_4)_b/M_cN_d$ may be doped with carbon additives scattered between grain boundaries or coated on the grain surfaces. The doped carbon additive may provide the final cathode material product with 1-15% of carbon by weight. In one embodiment, the carbon additive includes one or more members selected from the group consisting of carbon black, acetylene black, graphite and carbohydrate compound. In other embodiments, the carbon additive may include other carbon-related elements, precursors or compounds.

The microstructure of the mixed crystal compound, which is capable of being utilized as a cathode material, includes the lithium compound and the metal compound having a mixed-crystalline structure with mixed crystal lattices. The cathode material can come in at least three possible forms: smaller crystals residing within a larger crystal lattice, smaller crystal residing in between grain boundaries of large crystals, or smaller crystals residing on the exterior grain surfaces of a large crystal.

Reference is now made to FIGS. 1-4 illustrating a mixed crystal 10 having the chemical formula $Li_aA_{1-y}B_y(XO_4)_b/M_cN_d$ according to an embodiment of the presently disclosed invention. Specifically, the mixed crystal 10 includes a mixture of a lithium compound $[Li_aA_{1-y}B_y(XO_4)_b]$ 12 and a mixed metal crystal or metal compound $[M_cN_d]$ 14. The lithium compound 12 has a larger crystal lattice while the metal compound 14 has a smaller crystal lattice.

Figure 2:
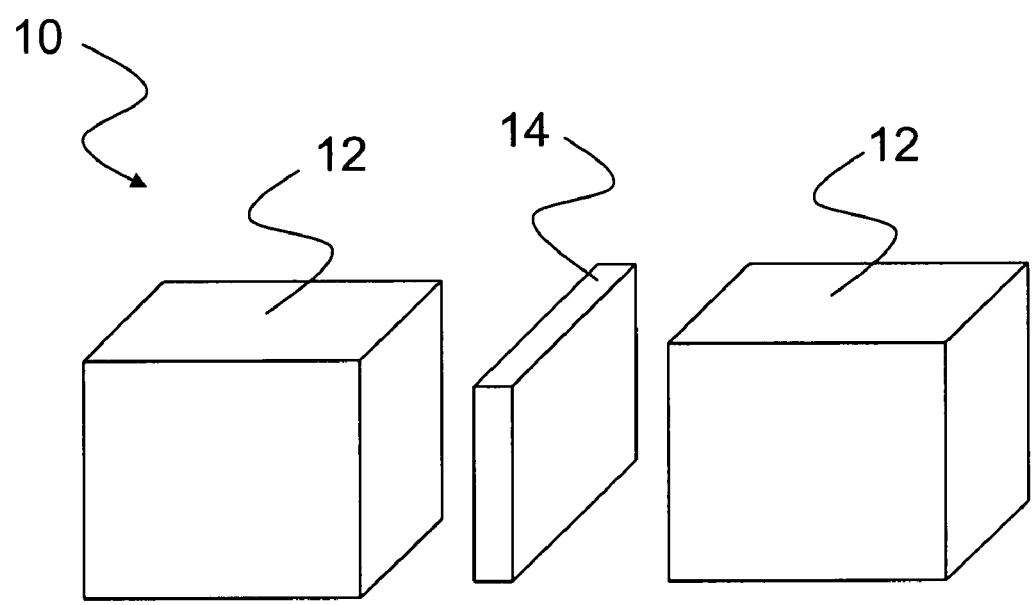
Figure 3:
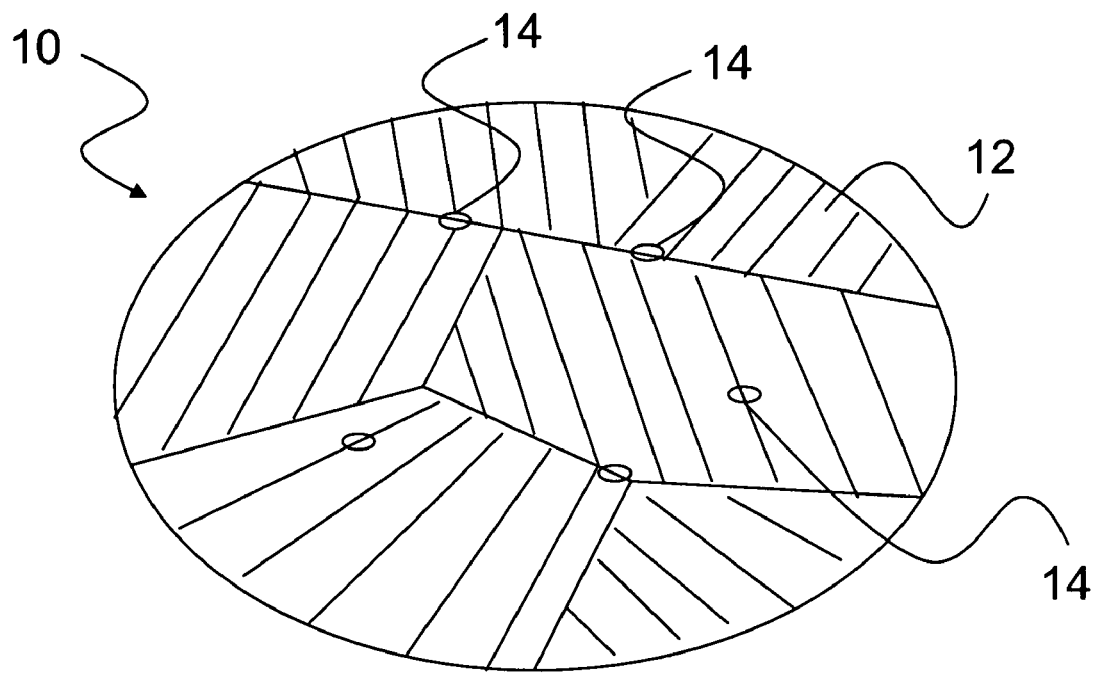
Figure 4:
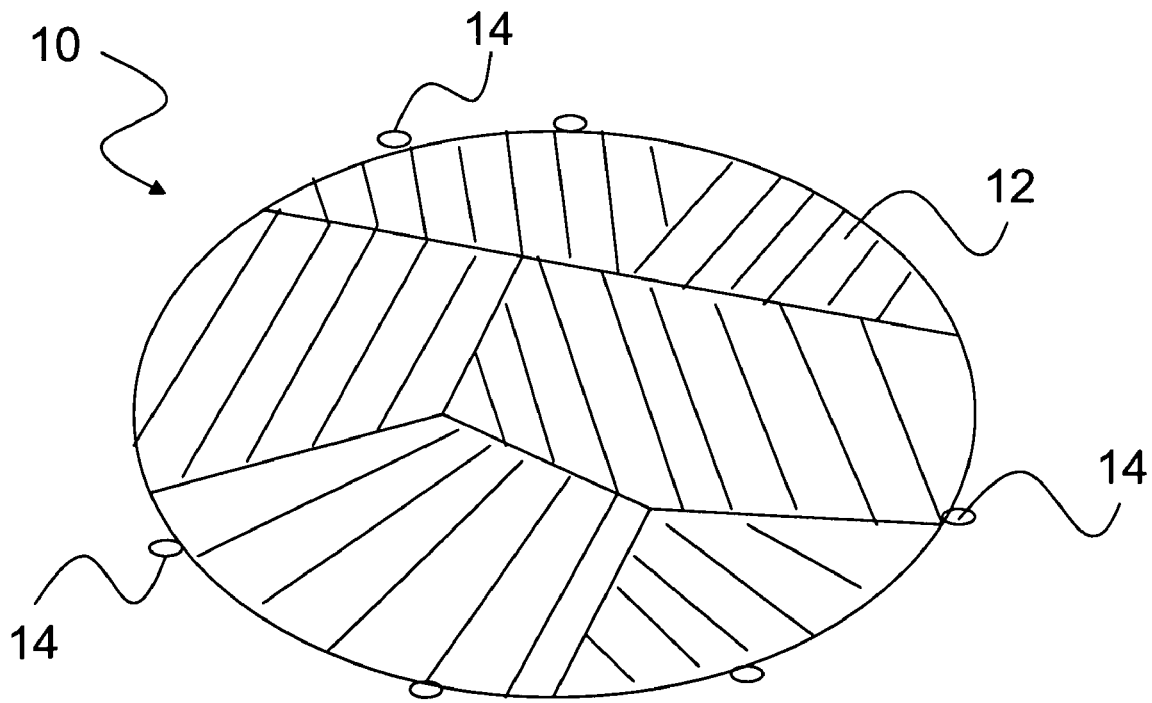

In one instance, the metal compound 14, having a smaller crystal lattice 14, may be received or distributed within the lithium compound 12 having the larger crystal lattice 12 as best illustrated in FIG. 1. In another instance, the metal compound 14 can be received or distributed between two or more large crystal lattices 12 as best illustrated in FIG. 2. Alternatively, the metal compound 14 can reside within grain boundaries of the lithium compound 12 as best illustrated in FIG. 3. Lastly, the metal compound 14 may be dispersed about the exterior grain surfaces of the lithium compound 12 as best illustrated in FIG. 4. In all of these instances, lithium ion migration serves as a bridge either within a crystal lattice or in between two or more crystal lattices, wherein lithium ions can be fully released for enhanced electrical properties including electrical conductance, capacitance and recyclability. The mixed crystal may also provide enhanced electrochemical properties.

In other embodiments, the mixed crystal 10 may take on mixed crystalline forms. In other words, during formation of the metal compound 14 by mixing at least two metal oxides, a large number of crystal defects may be introduced within the intermediary or composite crystals such that the electronic states and formation of the metal oxides are altered or changed. The metal compound 14 with its mixed crystalline structure, therefore, contains a large number of oxygen vacancies and missing oxygen atoms. The oxygen vacancies can facilitate carrier conduction thereby enhancing the conductivity of the mixed crystal 10. The formation of the metal compound 14 having two or more metal oxides will become more apparent in subsequent discussion.

In some embodiments, the metal compound 14 can be received between the grain boundaries or on the exterior crystal lattices of the lithium compound 12 in forming the mixed crystal 10 as described above. In the alternative, the metal compound 14 and the lithium compound 12 may be heated or sintered at about 600-900° C. in an inert gas or reducing gas atmosphere for at least 2 hours. The resulting mixed crystal 10 provides an enhanced active material with improved electrical properties including conductivity and electrochemical properties thereby enhancing conductivity and charging capacity of a lithium secondary battery.

In one embodiment, the lithium compound has the general formula $LiM_aN_bXO_c$, wherein: M is a first-row transition metal including Fe, Mn, Ni, V, Co and Ti; N is a metal selected from the group Fe, Mn, Ni, V, Co, Ti, Mg, Ca, Cu, Nb, Zr and rare-earth metals; X is selected from elements P, Si, S, V and Ge; and a, b and c have respective values that would render said lithium compound charge-neutral. The lithium compound can include a metal intercalation compound having a similar general formula. In other embodiments, the lithium compound has the general formula $Li_aA_{1-y}B_y(XO_4)_b$, wherein: A is a first-row transition metal including Fe, Mn, Ni, V, Co and Ti; B is a metal selected from the group Fe, Mn, Ni, V, Co, Ti, Mg, Ca, Cu, Nb, Zr and rare-earth metals; X is selected from elements P, Si, S, V and Ge; and $0<a\leq1$, $0\leq y\leq0.5$ and $0<b\leq1$. In yet another embodiment, the metal compound has the general formula $M_cN_d$, wherein M is metal selected from IA, IIA, IIIA, IVA, VA, IIIB, IVB and VB groups in the periodic table; N is selected from O, N, H, S, $SO_4$, $PO_4$, OH, Cl, F, and C; and $0<c\leq4$ and $0<d\leq6$.

In another embodiment, a cathode material for lithium secondary batteries can be provided by sintering lithium iron phosphate ($LiFePO_4$) with a mixture compound, the cathode material capable of providing $LiFePO_4$:mixture compound molar ratios of 1:0.001-0.1. In this embodiment, the mixture compound can be formed of two or more metal oxides wherein the metal can be selected from groups IA, IIA, IIIA, IVA, VA, IIIB, IVB and VB of the periodic table. In another embodiment, the weight of a first metal oxide is about 0.5-20% of the weight of a second metal oxide.

The mixture of metal oxides can take on a mixed crystal configuration. Based on mixed crystal formation theory, mixing of two or more metal oxides can form a composite mixed metal crystal such that a plurality of crystal defects are introduced to the crystal structure and lattice. The electronic states of the metal oxides are altered or changed thereby producing a large number of oxygen atom vacancies. These vacancies facilitate electronic carrier conductions thus producing a highly conductive mixed metal crystal.

The metal mixture compound, having a mixed crystalline configuration, can be coupled to the crystal lattices of $LiFePO_4$ by a heating or sintering process. Alternatively, after the metal oxides have been heated and the mixed metal crystal has been formed, the mixed metal crystal can be coupled to the crystal lattices of $LiFePO_4$ to provide a lithium iron phosphate cathode material with a mixed crystal structure and configuration. The resulting mixed crystal structure can effectively improve the conductivity, electrochemical properties, and greatly enhance the charge capacity of the lithium secondary battery.

In other embodiments, the lithium iron phosphate cathode material can further include carbon coating on the exterior surfaces of the sintered product, the amount of carbon material added being capable of providing the final product with 1-15% of carbon by weight. The types of carbon material that can be utilized include without limitation one or more of carbon black, acetylene black, graphite and carbohydrate compound.

The invention also includes batteries made from the new cathode materials described in other embodiments.

A method of preparing a mixed crystal lithium iron phosphate cathode material includes evenly mixing at least one $LiFePO_4$ compound with a mixture compound and heating the resulting mixture to 600-900° C. in an inert gas or reducing gas atmosphere for between 2-48 hours. The mixture compound includes two or more metal oxides wherein the metal can be selected from groups IA, IIA, IIIA, IVA, VA, IIIB, IVB and VB of the periodic table. The mixture compound provides a mixed crystalline structure, wherein a method of preparing the mixture compound with the corresponding mixed crystalline structure includes mixing metal oxides from groups IA, IIA, IIIA, IVA, VA, IIIB, IVB and VB, and heating the mixture to 600-1200° C. for between 2-48 hours.

The $LiFePO_4$ compound may be prepared by providing lithium, iron and phosphate sources to provide Li, Fe and P atoms with Li:Fe:P molar ratios of 1:1:1. In other embodiments, different Li:Fe:P molar ratios may be adopted. The mixture can accordingly be grinded in a ball mill for 2-48 hours, dried between 40-80° C. or stirred until dry, and heated to 600-900° C. in an inert gas or reducing gas atmosphere for between 2-48 hours.

After combining the $LiFePO_4$ compound with the mixture compound having mixed crystalline structure, carbon additives can be provided to the resulting mixture and sintered to facilitate carbon coating. The amount of carbon additives is capable of providing the resulting lithium iron phosphate cathode material with 1-15% of carbon by weight. The types of carbon material that can be utilized include without limitation one or more of carbon black, acetylene black, graphite and carbohydrate compound. The carbon coating process further enhances the electrical conductivity of the cathode material.

Another method of preparing a mixed crystal cathode material includes evenly mixing lithium, iron and phosphate sources and heat to 600-900° C. in an inert gas or reducing gas atmosphere for at least 2 hours. The resulting mixture can then be combined with a mixed metal compound having a combination of two or more metal oxides selected from groups IA, IIA, IIIA, IVA, VA, IIIB, IVB and VB of the periodic table. In one embodiment, the lithium source, iron source, phosphate source and mixed metal compound are capable of providing Li:Fe:P:mixed metal compound molar ratios of 1:1:1:0.001-0.1. In other embodiments, different Li:Fe:P:mixed metal compound molar ratios may be adopted. Furthermore, at least one carbon source can be added to the resulting mixture, the carbon source including one or more of the following without limitation: carbon black, acetylene black, graphite and carbohydrate compound. The amount of carbon source added to the resulting mixture should be able to provide the final product with 1-15% of carbon by weight.

According to the presently disclosed embodiments, lithium sources capable of being used in preparing the cathode material include one or more of the following compounds without limitation: lithium carbonate, lithium hydroxide, lithium oxalate, lithium acetate, lithium fluoride, lithium chloride, lithium bromide, lithium iodide and lithium dihydrogen phosphate. Likewise, iron sources include one or more of the following compounds without limitation: ferrous oxalate, ferrous acetate, ferrous chloride, ferrous sulfate, iron phosphate, ferrous oxide, ferric oxide, iron oxide and ferric phosphate. When using a trivalent iron compound as a source of iron, the ball milling process requires adding a carbon source to reduce the trivalent iron to a divalent iron. Furthermore, phosphorous sources include one or more of the following compounds without limitation: ammonium, ammonium phosphate, ammonium dihydrogen phosphate, iron phosphate, ferric phosphate and lithium hydrogen phosphate.

During the mixing process, specifically grinding in a ball mill, one or more solvents may be introduced including ethanol, DI water and acetone. In other embodiments, other mixing media and solvents may be utilized. In addition, the mixture can be dried between 40-80° C. or stirred until dry.

The types of inert gases that may be utilized include helium, neon, argon, krypton, xenon, radon and nitrogen. Additionally, reducing gases including hydrogen and carbon monoxide can also be incorporated. Other suitable gases may also be adopted.

It is understood that other lithium, iron, phosphorous and carbon sources may be utilized along with suitable solvents, inert gases and reducing gases as will be appreciated by one skilled in the art.

It is understood that the new cathode materials described above can be used to make lithium secondary batteries and other types of batteries.

The following are various embodiments of the mixed-crystal lithium iron phosphate cathode materials according to the presently disclosed invention.

Example 1

Mix $LiFePO_4$ with [$Y_2O_3$ and $Sb_2O_3$ (mass ratio 0.2:1)] to provide [$LiFePO_4$:($Y_2O_3$ and $Sb_2O_3$)] molar ratio of [1:(0.04)], add carbon-containing acetylene black (amount of carbon capable of providing 10% by weight of carbon content in the final product), grind the mixture in a ball mill for 15 hours, remove and dry at 60° C. Heat the resulting powder in a nitrogen atmosphere at 650° C. for 5 hours to provide a $LiFePO_4$ composite cathode material.

Example 2

Mix $Sb_2O_3$ and $TiO_2$ (mass ratio 0.15:1), grind the mixture in a ball mill for 5 hours, remove and dry at 60° C. Heat the resulting powder at 1000° C. for 8 hours to provide a $Sb_2O_3$ and $TiO_2$ mixed compound. Under x-ray diffraction (XRD), the mixed compound did not exhibit new characteristic peaks on the XRD pattern indicating that the two oxides did not generate a new oxide compound. See FIGS. 5 & 6. The mixed compound, therefore, remained in a mixed crystal state indicative of a mixed crystal structure.

Mix $LiFePO_4$ with the mixed crystal to provide a molar ratio of 1 to 0.02, add carbon-containing glucose (amount of carbon capable of providing 8% by weight of carbon content in the final product), grind the mixture in a ball mill for 20 hours, remove and dry at 60° C. Heat the resulting powder in a nitrogen atmosphere at 750° C. for 8 hours to provide a $LiFePO_4$ composite cathode material.

Example 3

Mix lithium fluoride, iron phosphate and diammonium phosphate to provide Li:Fe:P atomic ratio of 1.02:1:1, grind the mixture in a ball mill for 20 hours, remove and dry at 65° C. Heat the resulting powder in a nitrogen atmosphere at 750° C. for 12 hours to provide $LiFePO_4$.

Mix $V_2O_5$ and $TiO_2$ (mass ratio 0.08:1), grind the mixture in a ball mill for 8 hours, remove and dry at 65° C. Heat the resulting powder at 500° C. for 8 hours to provide a $V_2O_5$ and $TiO_2$ mixed compound. Under x-ray diffraction (XRD), the mixed compound did not exhibit new characteristic peaks on the XRD pattern indicating that the two oxides did not generate a new oxide compound. The mixed compound, therefore, remained in a mixed crystal state indicative of a mixed crystal structure.

Mix $LiFePO_4$ with the mixed crystal to provide a molar ratio of 1 to 0.05, grind the mixture in a ball mill for 10 hours, remove and dry at 60° C. Heat the resulting powder in a nitrogen atmosphere at 750° C. for 8 hours to provide a $LiFePO_4$ composite cathode material.

Example 4

Mix MgO and $Al_2O_3$ (mass ratio 0.05:1), grind the mixture in a ball mill for 6 hours, remove and dry at 60° C. Heat the resulting powder to 1000° C. for 6 hours to provide a MgO and $Al_2O_3$ mixed compound. Under x-ray diffraction (XRD), the mixed compound did not exhibit new characteristic peaks on the XRD pattern indicating that the two oxides did not generate a new oxide compound. The mixed compound, therefore, remained in a mixed crystal state indicative of a mixed crystal structure.

Mix $LiFePO_4$ with the mixed crystal to provide a molar ratio of 1 to 0.002, add carbon-containing graphite (amount of carbon capable of providing 15% by weight of carbon content in the final product), grind the mixture in a ball mill for 15 hours, remove and dry at 65° C. Heat the resulting powder in a nitrogen atmosphere at 700° C. for 10 hours to provide a $LiFePO_4$ composite cathode material.

Example 5

Mix lithium carbonate, ferric oxide, diammonium phosphate, $SnO_2$ and $Nb_2O_5$ to provide Li:Fe:P:($SnO_2$ and $Nb_2O_5$) molar ratio of 1.01:1:1:0.04, wherein $SnO_2$ is 5% of $Nb_2O_5$ by mass and may be added at the same time to bring about reduction of the ferric oxide along with carbon-containing acetylene black (amount of carbon capable of providing 5% by weight of carbon content in the final product), grind the mixture in a ball mill for 24 hours, and stir at 65° C. until dry.

Heat the resulting powder in a nitrogen atmosphere at 750° C. for 20 hours to provide a LiFePO$_4$ composite cathode material.

Example 6

Mix lithium carbonate, ferrous oxalate, diammonium phosphate, SnO$_2$ and TiO$_2$ to provide Li:Fe:P:(SnO$_2$ and TiO$_2$) molar ratio of 1.02:1:1:0.03, wherein SnO$_2$ is 15% of TiO$_2$ by mass, carbon-containing sucrose (amount of carbon capable of providing 7% by weight of carbon content in the final product), grind the mixture in a ball mill for 20 hours, remove and dry at 65° C. Heat the resulting powder in a nitrogen atmosphere at 750° C. for 18 hours to provide a LiFePO$_4$ composite cathode material.

Example 7

Mix lithium carbonate, ferrous phosphate, Nb$_2$O$_5$ and TiO$_2$ to provide Li:Fe:P:(Nb$_2$O$_5$ and TiO$_2$) molar ratio of 1:1:1:0.01, wherein Nb$_2$O$_5$ is 5% of TiO$_2$ by mass, carbon-containing sucrose (amount of carbon capable of providing 5% by weight of carbon content in the final product), grind the mixture in a ball mill for 20 hours, remove and dry at 65° C. Heat the resulting powder in a nitrogen atmosphere at 750° C. for 15 hours to provide a LiFePO$_4$ composite cathode material.

Reference 1

Mix lithium carbonate, ferrous oxalate, copper fluoride and diammonium phosphate to provide a molar ratio of 1:0.9:0.1:1, add carbon-containing sucrose (amount of carbon capable of providing 7% by weight of carbon content in the final product), grind the mixture in a ball mill for 10 hours, remove and dry at 70° C. Heat the resulting powder in a nitrogen atmosphere at 650° C. for 20 hours to provide a LiFePO$_4$ composite cathode material.

Testing of Examples 1-7 and Reference 1
(1) Battery Preparation
(a) Cathode Active Material Separately combine 100 grams of each of the LiFePO$_4$ composite material from examples 1-6 and reference 1 with 3 grams of polyvinylidene fluoride (PVDF) binder and 2 grams of acetylene black to 50 grams of N-methylpyrrolidone (NMP), mix in a vacuum mixer into a uniform slurry, apply a coating of about 20 microns thick to each side of an aluminum foil, dry at 150° C., roll and crop to a size of 480×44 mm$^2$ to provide about 2.8 grams of cathode active material.

(b) Anode Active Material

Combine 100 grams of natural graphite with 3 grams of polyvinylidene fluoride (PVDF) binder and 3 grams of conductive acetylene black to 100 grams of N-methylpyrrolidone (NMP), mix in a vacuum mixer into a uniform slurry, apply a coating of about 12 microns thick to each side of a copper foil, dry at 90° C., roll and crop to a size of 485×45 mm$^2$ to provide about 2.6 grams of anode active material.

(c) Battery Assembly

Separately wind each of the cathode and anode active materials with polypropylene film into a lithium secondary battery core, followed by dissolving one mole of LiPF$_6$ in a mixture of non-aqueous electrolyte solvent EC/EMC/DEC to provide a ratio of 1:1:1, inject and seal the electrolyte having a capacity of 3.8 g/Ah into the battery to provide separate lithium secondary batteries for testing.

(2) Specific Discharge Capacity Test

Using a current charge of 0.2 C, charge each battery for 4 hours, and then at constant voltage to 3.8 V. After setting the battery aside for 20 minutes, using a current of 0.2 C discharge from 3.8 V to 3.0 V, record the battery's initial discharge capacity, and use the following equation to calculate the battery's initial specific capacity:

Initial specific capacity=Initial discharge capacity (milliampere hour)/weight of cathode active material (grams).

(3) Measure the Specific Capacity After 500 Cycles
(4) Separately Measure Specific Capacity at 1 C, 3 C and 5 C The testing cycle results for examples 1-7 and reference 1 are shown in Table 1.

TABLE 1

Test results of LiFePO$_4$ composite cathode materials and reference sample.

|  | Ex. 1 | Ex. 2 | Ex. 3 | Ex. 4 | Ex. 5 | Ex. 6 | Ex. 7 | Ref. 1 |
|---|---|---|---|---|---|---|---|---|
| Initial specific capacity (mAh/g) | 130 | 125 | 126 | 125 | 128 | 131 | 131 | 98 |
| Specific capacity after 500 cycles (mAh/g) | 128 | 124 | 124 | 123 | 126 | 130 | 128 | 62 |
| Specific capacity at 1 C (mAh/g) | 126 | 120 | 120 | 121 | 122 | 126 | 124 | 80 |
| Specific capacity at 3 C (mAh/g) | 111 | 107 | 107 | 106 | 109 | 112 | 116 | 50 |
| Specific capacity at 5 C (mAh/g) | 108 | 105 | 106 | 105 | 106 | 109 | 109 | 34 |

From the data in Table 1, it can be observed that the LiFePO$_4$ composite cathode materials according to examples 1-7 of the presently disclosed invention provide higher initial specific discharge capacity than reference 1. Accordingly, the LiFePO$_4$ composite cathode materials for lithium secondary batteries and methods of manufacturing such according to the presently disclosed embodiments provide superior electrical performance, e.g., higher discharge capacity, low capacity loss after multiple cycles, and high discharge capacity retention rate.

Additional experimental data are provided in Tables 2 and 3 illustrating the electrical properties of some of the examples described above.

TABLE 2

|  | Charging capacity | Discharging capacity | Efficiency | Middle discharge voltage | Set capacity | Specific capacity (mAh/g) |
|---|---|---|---|---|---|---|
| Example 1 | 11.16 | 9.91 | 88.8% | 3.372 | 9.60 | 154.86 |
| Example 3 | 10.89 | 10.02 | 91.9% | 3.371 | 9.74 | 156.48 |
| Example 4 | 11.22 | 10.18 | 90.7% | 3.376 | 9.88 | 159.09 |
| Example 5 | 10.84 | 10.01 | 92.3% | 3.375 | 9.74 | 156.34 |
| Minimum | 10.84 | 9.91 | 88.8% | 3.37 | 9.60 | 154.86 |
| Average | 11.03 | 10.03 | 90.9% | 3.37 | 9.74 | 156.70 |
| Maximum | 11.22 | 10.18 | 92.3% | 3.38 | 9.88 | 159.09 |
| Range | 0.38 | 0.27 | 3.5% | 0.00 | 0.28 | 4.23 |
| Median | 11.03 | 10.01 | 91.3% | 3.37 | 9.74 | 156.41 |
| STDEV | 0.19 | 0.11 | 1.6% | 0.00 | 0.12 | 1.76 |

TABLE 3

|  | Charging capacity | Discharging capacity | Efficiency | Middle discharge voltage | Set capacity | Specific capacity (mAh/g) |
|---|---|---|---|---|---|---|
| Example 1 | 11.33 | 10.20 | 90.0% | 3.343 | 9.67 | 159.38 |
| Example 2 | 10.16 | 9.19 | 90.5% | 3.362 | 8.75 | 143.66 |
| Example 4 | 11.19 | 10.18 | 90.9% | 3.367 | 9.67 | 159.06 |
| Example 5 | 11.21 | 10.20 | 91.0% | 3.350 | 9.67 | 159.36 |
| Minimum | 10.16 | 9.19 | 90.0% | 3.34 | 8.75 | 143.66 |
| Average | 10.97 | 9.94 | 90.6% | 3.36 | 9.44 | 155.36 |
| Maximum | 11.33 | 10.20 | 91.0% | 3.37 | 9.67 | 159.38 |
| Range | 1.17 | 1.01 | 1.0% | 0.02 | 0.92 | 15.72 |
| Median | 11.20 | 10.19 | 90.7% | 3.36 | 9.67 | 159.21 |
| STDEV | 0.55 | 0.50 | 0.4% | 0.01 | 0.46 | 7.81 |

Figure 5:
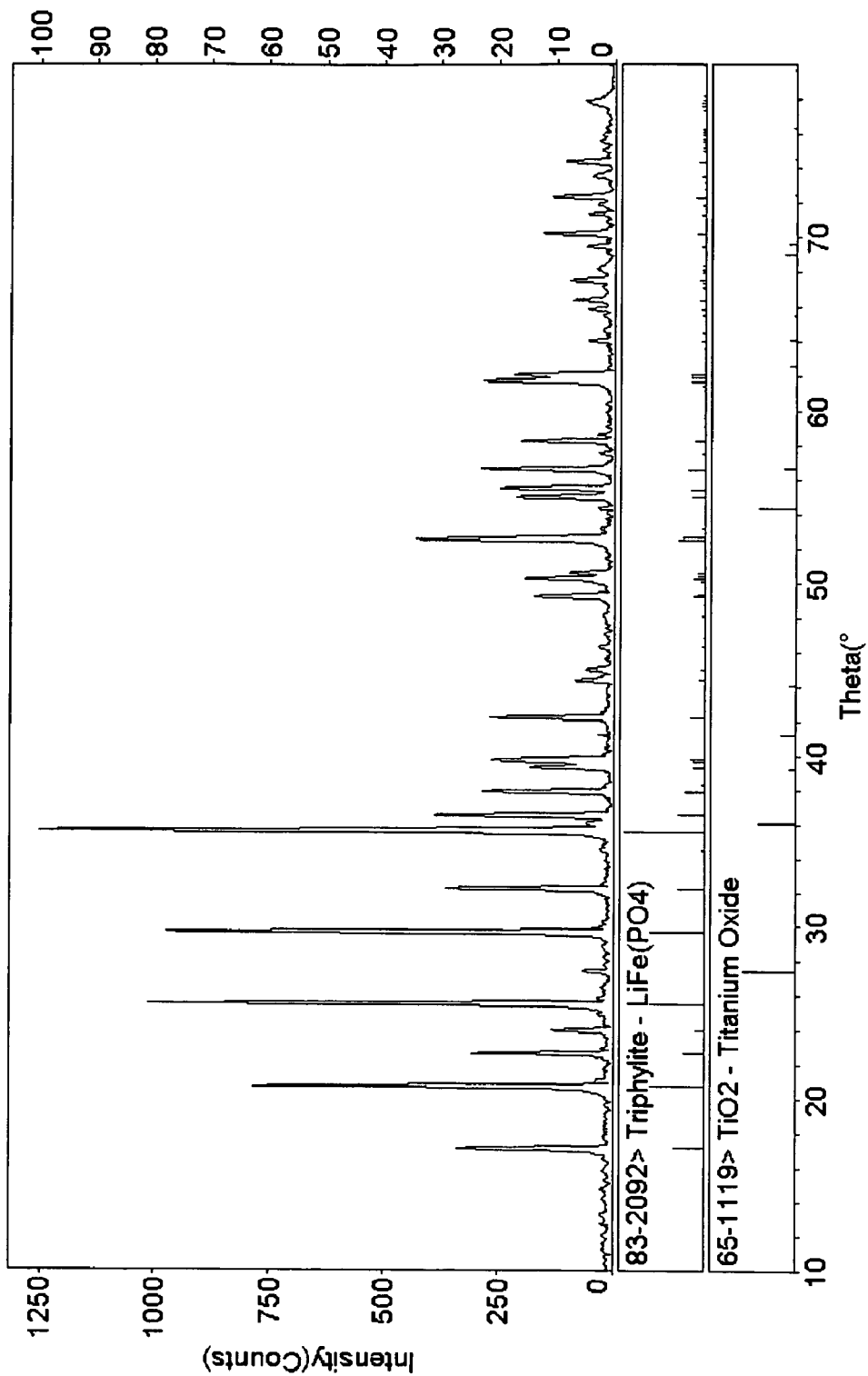
FIG. 5 illustrates an x-ray diffraction (XRD) pattern of a composite compound according to Example 2.

Reference is now made to FIG. 5 illustrating an x-ray diffraction (XRD) pattern of a cathode composite compound according to example 7. As shown in the figure, the $TiO_2$ peak from the starting material is missing after formation of the cathode composite compound, which is suggestive of a substance having mixed crystalline structure or a mixed crystal compound. It is also possible that the $TiO_2$ exchange has taken place with Fe atoms. However, it is suspected that a mixed crystal is the most likely outcome.

In another embodiment, a cathode active material can be provided having a mixed crystal structure, the mixed crystal structure having a first crystalline substance having one or more members with the general formulas $Li_xM_y(XO_4)_z$, $LiMXO_5$, $LiMXO_6$ and $LiMX_2O_7$, wherein:

$0<x/z\leq 1$ and $0\leq y/z\leq 1$;

M is selected from elements Na, Mn, Fe, Co, Ni, Ti, Nb and V; and

X is selected from elements P, S, As, Mo and W.

The mixed crystal structure further includes a second crystalline substance having one or more members with the general formula $A_aM_bN_cO_d$, wherein:

A, M and N are different metals selected from groups IIA, IIIA, IVA, VA, IB, IIB, IIIB, IVB, VB, VIB, VIIB and VIII of the periodic table;

$0\leq a\leq 6$, $0\leq b\leq 6$, $0<c\leq 6$ and $0<d\leq 12$; and wherein a and b cannot both be 0 at the same time.

The mixed crystal structure can be formed by sintering two or more compounds, the intermediary mixture having oxygen vacancies or metallic crystalline structures. The two or more compounds do not exhibit any major chemical reactions when mixed together. However, upon sintering, a large number of crystalline defects can be formed thereby altering the electronic states of the compounds creating a large number of oxygen vacancies. The sintering process can be carried out by heating the compounds at a rate of about 5 to 20° C. per minute to temperatures of about 500 to 850° C. for about 5 to 32 hours. These oxygen vacancies provide the needed carriers thus greatly enhancing the electrical conductivity of the mixed crystal. Accordingly, the cathode active material can achieve electrical conductivity of about 0.01 to 10 S/cm (Siemens per centimeter) at about 25° C., the electrical conductivity values being greater than traditional lithium iron phosphate cathode active materials. In this embodiment, the first crystalline substance and the second crystalline substance have molar ratios of about 1 to 0.01-0.05.

The first crystalline substance can have a mixed crystalline structure with the general formula $Li_xM_y(XO_4)_z$ including one or more members selected from the group consisting of $LiFePO_4$, $LiMnPO_4$ and $LiCoPO_4$. In other embodiments, single-crystalline structures including $Li_3Fe_2(PO_4)_3$, $LiTi_2(PO_4)_3$, $Li_3V_2(PO_4)_3$ and $Li_2NaV_2(PO_4)_3$ may be incorporated. For the general formula $LiMXO_5$, the first crystalline substance can be $LiTiPO_5$. For the general formula $LiMXO_6$, the first crystalline substance can include $LiVMoO_6$ and $LiVWO_6$. For the general formula $LiMX_2O_7$, the first crystalline substance can include $LiVP_2O_7$ and $LiFeAs_2O_7$. The second crystalline substance can include one or more members selected from the group consisting of $Bi_4Ti_3O_{12}$, $CuNb_2O_6$, $MnTaO_4$, $FeWO_4$, $ZnZrNb_2O_8$, $NiNb_2O_6$, $NiZrNb_2O_8$, $FeTiNb_2O_8$, $MnTiNb_2O_8$, $MgSnNb_2O_8$, $ZnTa_2O_6$, $Cu_{0.85}Zn_{0.15}Nb_2O_6$, $YBa_3Ti_2O_{8.5}$, $Zr_{0.75}Ti_{0.75}Sn_{0.5}O_4$, $HfTiO_4$ and $MgNb_2O_6$.

In one embodiment, the second crystalline substance can be formed by heating oxide compounds of A, M and N at molar ratio of a:b:c at about 400 to 1000° C. for about 8 to 15 hours. The sintered product can be measured with a Rigaku D/MAX-2200/PC x-ray diffraction (XRD) instrument to acquire an XRD pattern, which can subsequently be compared with known chemical standards provided by the system. The oxide compound or oxygen-containing compound of A can be oxides of A and/or sintered products of oxides of A and other compounds, the oxides of A and other compounds include hydroxides of A, carbonates of A, and bicarbonates of A. Likewise, the oxide compound or oxygen-containing compound of M can be oxides of M and/or sintered products of oxides of M and other compounds, the oxides of M and other compounds include hydroxides of M, carbonates of M, and bicarbonates of M. Similarly, the oxide compound or oxygen-containing compound of N can be oxides of N and/or sintered products of oxides of N and other compounds, the oxides of N and other compounds include hydroxides of N, carbonates of N, and bicarbonates of N.

The cathode active material can further include a carbon additive, wherein the carbon additive is capable of providing the mixed crystal structure with about 1-5% of carbon by weight. The carbon additive includes one or more members selected from the group consisting of carbon black, acetylene black, graphite, glucose, sucrose, citric acid, starch, dextrin, polyethylene glycol, and other organic and inorganic sources.

In another embodiment, a cathode active material can be provided, the cathode active material having a mixed crystal, the mixed crystal having: a first crystalline substance having a combination of lithium, iron and phosphorous sources, wherein the lithium, iron and phosphorous (Li:Fe:P) sources have molar ratios of about 0.95-1.1:1:0.95-1.1; and a second crystalline substance having one or more members with the general formula $A_aM_bN_cO_d$, wherein:

A, M and N are different metals selected from groups IIA, IIIA, IVA, VA, IB, IIB, IIIB, IVB, VB, VIB, VIIB and VIII of the periodic table;

$0 \leq a \leq 6$, $0 \leq b \leq 6$, $0 < c \leq 6$ and $0 < d \leq 12$; and wherein a and b cannot both be 0 at the same time.

Like above, the mixed crystal structure in this embodiment can be formed by sintering two or more compounds with the intermediary mixture having oxygen vacancies or metallic crystalline structures for providing the carriers thus enhancing the electrical conductivity of the mixed crystal. The sintering process can be carried out by heating the compounds at a rate of about 5 to 20° C. per minute to temperatures of about 500 to 850° C. for about 5 to 32 hours whereby the cathode active material can achieve electrical conductivity of about 0.01 to 10 S/cm (Siemens per centimeter) at about 25° C. In this embodiment, the phosphorous source and the second crystalline substance has molar ratios of about 1 to 0.01-0.05, taking only the phosphorous source in the material into consideration. Further, the second crystalline substance can be formed by heating oxide compounds of A, M and N at molar ratio of a:b:c at about 400 to 1000° C. for about 8 to 15 hours. The oxide compounds of A, M and N being similar to those described above.

The second crystalline substance includes one or more members selected from the group consisting of $Bi_4Ti_3O_{12}$, $CuNb_2O_6$, $MnTaO_4$, $FeWO_4$, $ZnZrNb_2O_8$, $NiNb_2O_6$, $NiZrNb_2O_8$, $FeTiNb_2O_8$, $MnTiNb_2O_8$, $MgSnNb_2O_8$, $ZnTa_2O_6$, $Cu_{0.85}Zn_{0.15}Nb_2O_6$, $YBa_3Ti_2O_{8.5}$, $Zr_{0.75}Ti_{0.75}Sn_{0.5}O_4$, $HfTiO_4$ and $MgNb_2O_6$.

The lithium source includes one or more members selected from the group consisting of lithium carbonate, lithium hydroxide, lithium oxalate and lithium acetate; the iron source includes one or more members selected from the group consisting of ferrous oxalate, ferrous carbonate, iron acetate, iron oxide, iron phosphate, iron pyrophosphate and iron nitrate; and the phosphate source includes one or more members selected from the group consisting of ammonium phosphate, ammonium dihydrogen phosphate, ammonium, iron phosphate, phosphoric acid and lithium dihydrogen phosphate.

The cathode active material further includes a carbon additive, wherein the carbon additive is capable of providing the mixed crystal with about 1-5% of carbon by weight. The carbon additive includes one or more members selected from the group consisting of carbon black, acetylene black, graphite., glucose, sucrose, citric acid, starch, dextrin and polyethylene glycol, and other organic and inorganic sources.

In another embodiment, a cathode active material can be provided, the cathode active material having a mixed crystal, the mixed crystal having: a first crystalline substance having one or more members selected from the group consisting of $LiFePO_4$, $LiMnPO_4$, $LiCOPO_4$, $Li_3Fe_2(PO_4)_3$, $LiTi_2(PO_4)_3$, $Li_3V_2(PO_4)_3$, $Li_2NaV_2(PO_4)_3$, $LiTiPO_5$, $LiVMoO_6$, $LiVWO_6$, $LiVP_2O_7$ and $LiFeAs_2O_7$; and a second crystalline substance having one or more members selected from the group consisting of $Bi_4Ti_3O_{12}$, $CuNb_2O_6$, $MnTaO_4$, $FeWO_4$, $ZnZrNb_2O_8$, $NiNb_2O_6$, $NiZrNb_2O_8$, $FeTiNb_2O_8$, $MnTiNb_2O_8$, $MgSnNb_2O_8$, $ZnTa_2O_6$, $Cu_{0.85}Zn_{0.15}Nb_2O_6$, $YBa_3Ti_2O_{8.5}$, $Zr_{0.75}Ti_{0.75}Sn_{0.5}O_4$, $HfTiO_4$ and $MgNb_2O_6$.

The cathode active material can achieve electrical conductivity of about 0.01 to 10 S/cm at about 25° C. The cathode active material further includes a carbon additive, wherein the carbon additive is capable of providing the mixed crystal with about 1-5% of carbon by weight. The carbon additive includes one or more members selected from the group consisting of carbon black, acetylene black, graphite, glucose, sucrose, citric acid, starch, dextrin and polyethylene glycol, and other organic and inorganic sources.

In other embodiments, a lithium ion secondary battery can be provided, the lithium ion secondary battery having a battery case, electrodes and electrolyte, the electrodes and electrolyte being sealed within the battery case, the electrodes having wounded or stacked cathode, anode and divider film, the cathode further including the cathode active materials described above.

The cathode includes cathode components such as the cathode active materials disclosed in the embodiments above along with adhesives. The adhesives can be hydrophobic or hydrophilic binding additives without any specific binder ratio restrictions. In one instance, the hydrophilic to hydrophobic adhesive binder can have weight ratios of about 0.3:1 to about 1:1. The adhesive can solid, aqueous or as an emulsion. The concentration can be adjusted accordingly based on methods of preparing the cathode, anode and the slurry viscosity and coating. In one example, the hydrophilic adhesive solution has a concentration of about 0.5 to 4 weight percent while the hydrophobic latex binder has a concentration of about 10 to 80 weight percent.

Hydrophobic adhesives can include PTFE, styrene butadiene rubber, or mixtures thereof. Hydrophilic adhesives can include HPMC, CMC, hydroxyethyl cellulose, polyvinyl alcohol, or mixtures thereof. The binder content can be about 0.01 to 8% by weight of the total cathode active material.

In addition, conductive agents may be incorporated in the cathode active material, the conductive agents include without limitation graphite, carbon fiber, carbon black, metal powders and fibers as well as any suitable material understood by one skilled in the art. The conductive agent can be about 0.1 to 20% by weight of the total cathode active material.

The method of preparing the cathode include using solvents to dissolve the cathode active material and mixing with adhesives and conductive agents to form a cathode slurry. The cathode slurry can be applied onto cathode collectors, dried, rolled or compressed, and sliced into pieces to produce the cathode. In one example, the slurry can be dried at about 100 to 150° C. for about 2 to 10 hours. The cathode collectors include aluminum foil, copper foil, nickel-plated steel or punched stainless steel. The types of solvent to use include N-methyl pyrrolidone (NMP), dimethylformamide (DMF), diethyl formamide (DEF), dimethyl sulfoxide (DMSO), tetrahydrofuran (THF), water, alcohol and mixtures thereof. The amount of solvent to use can be adjusted accordingly to provide the proper slurry coating and viscosity. In one instance, the amount of solvent can be about 40 to 90% by weight of the cathode active material. The method of preparing the cathode and types of solvents, adhesives, conductive agents and cathode collectors can also incorporate other techniques understood by one skilled in the art.

As discussed above, the lithium secondary battery includes a battery shell, electrodes and electrolyte, the electrodes and electrolyte capable of being sealed within the battery shell. The electrodes include wounded or stacked cathode, anode and divider film with the cathode utilizing the cathode active material of the presently disclosed embodiments.

The divider film can be situated between the cathode and anode for preventing electrical shorts and for maintaining the electrolytic solution. In one instance, the divider film can include any membrane including without limitation microporous membrane polyolefin, polyethylene fibers, ultra-fine glass fibers and fiber paper.

The anode can incorporate any anode active materials and known methods of forming such materials as known in the arts. The anode active material can be provided in slurry form and coated onto anode collectors similar to the cathode collectors above. Additionally, the anode active material may include carbon additives such as non-carbon graphite, graphite, and polymers having undergone high-temperature carbon oxidation. The carbon additive can also include pyrolytic coal, coke, organic polymer sintered materials and activated carbons. The organic polymer sintered materials include phenolic resin, epoxy resin, and carbonized products obtained by sintering.

Adhesives can utilize traditional adhesives for lithium secondary batteries including polyvinyl alcohol, PTFE, carboxymethyl cellulose (CMC), hydroxymethyl cellulose (HMC), and styrene butadiene rubber (SBR). The adhesive binder can be about 0.5 to 8 weight percent of the total anode active material.

The anode active material can further include conductive agents, the conductive agent capable of increasing electrical conductivity and reducing internal resistance of the battery. The conductive agent includes carbon black, nickel powder and copper powder. Other conductive agents known by one skilled in the art may also be utilized and can be about 0.1 to 12 weight percent of the anode active material.

The method of preparing the anode includes using solvents to dissolve the anode active material and mixing with adhesives and conductive agents to form an anode slurry. The anode slurry can be applied onto the anode collectors similar to that of the cathode slurry described above, dried, rolled or compressed, and sliced into pieces to produce the anode. In one example, the slurry can be dried at about 100 to 150° C. for about 2 to 10 hours. The types of solvent for dissolving the anode active material include N-methyl pyrrolidone (NMP), dimethylformamide (DMF), diethyl formamide (DEF), dimethyl sulfoxide (DMSO), tetrahydrofuran (THF), water, alcohol and mixtures thereof. The amount and concentration of solvents to use can be adjusted accordingly to provide the proper slurry coating and viscosity. Like the cathode slurry, the amount of anode slurry applied to the anode collector can be about 40 to 90 weight percent of the anode active material.

The electrolyte for the lithium secondary battery can be a non-aqueous electrolyte, which can be formed by dissolving lithium salt in a non-aqueous solvent. The lithium salt electrolyte can include one or more members selected from lithium hexafluorophosphate ($LiPF_6$), lithium perchlorate ($LiClO_4$), lithium tetrafluoroborate ($LiBF_4$), lithium hexafluoroarsenate ($LiAsF_6$), lithium hexafluorosilicate ($LiSiF_6$), lithium tetraphenylborate ($LiB(C_6H_5)_4$), lithium chloride (LiCl), lithium bromide (LiBr), lithium aluminum tetrachloride ($LiAlCl_4$), $LiC(SO_2CF_3)_3$, $LiCH_3SO_3$, and $LiN(SO_2CF_3)_2$. The non-aqueous solvent can be chain ester and ester ring mixed solution, the chain ester being one or more members of dimethyl carbonate (DMC), diethyl carbonate (DEC), ethylmethyl carbonate (EMC), methylpropyl carbonate (MPC), dimethylpropyl carbonate (DPC) and other fluoride or sulfur-containing unsaturated key chain organic esters, with the ester ring being one or more members of ethylene carbonate (EC), propylene carbonate (PC), vinylene carbonate (VC), gamma-butyrolactone ($\gamma$-BL), sodium fluoride and other lactone-containing or unsaturated organic ester rings. In one instance, the lithium salt electrolyte has a concentration of about 0.1 to 2 mole per liter.

The presently disclosed lithium secondary batteries can be provided by processes known by one skilled in the art. The preparation method includes winding or stacking cathode, anode and divider films into the battery core, and placing the battery core into the battery shell, adding the electrolyte, and seal the battery accordingly. The winding, stacking and sealing of the batteries can utilize traditional techniques as understood by one skilled in the art. Furthermore, other known steps of manufacturing the lithium secondary battery can be incorporated.

The following are various embodiments of mixed-crystal cathode active materials according to the presently disclosed invention.

Example A1

Mix $MnCO_3$, $TiO_2$ and $Nb_2O_5$ in a molar ratio of 1:1:1, grind the mixture in a ball mill for 5 hours, heat in a nitrogen atmosphere at 10° C. per minute to 500° C. and continue sintering the product for 10 hours. Using the Rigaku D/MAX-2200/PC, an XRD pattern was carried out on the sintered product. In comparison with the standard XRD pattern for $MnTiNb_2O_8$, it was determined that the sintered product is $MnTiNb_2O_8$.

Mix $LiFePO_4$ with the resulting $MnTiNb_2O_8$ from above in a molar ratio of 1:0.04, add starch as a source of carbon (amount of carbon capable of providing 5% by weight of carbon content in the final product). In one example, the $LiFePO_4$ can be prepared by mixing lithium carbonate, ferrous oxalate, and ammonium dihydrogen phosphate in a Li:Fe:P molar ratio of 1:1:1. Alternatively, the $LiFePO_4$ can be prepared by other lithium, iron and phosphate sources or by a third party.

Grind the mixture in a ball mill for 10 hours, remove and dry at 80° C. Heat the resulting powder in a nitrogen or argon atmosphere at 10° C. per minute to 600° C., continue sintering the product for 20 hours to provide a $LiFePO_4/MnTiNb_2O_8/C$ mixed crystal cathode active material.

Figure 6:
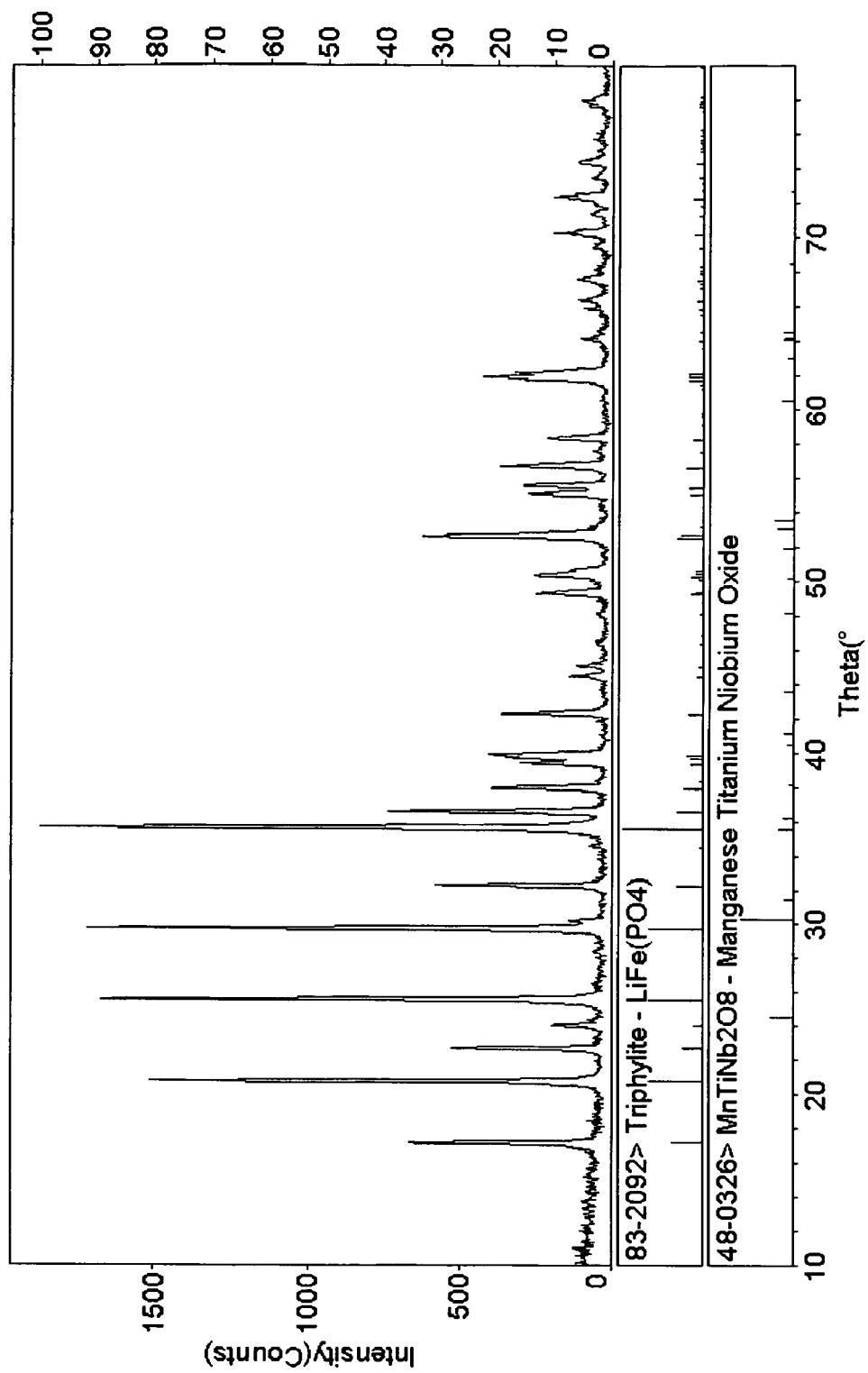
FIG. 6 illustrates the XRD pattern of a composite compound according to Example A1.

Using the Rigaku D/MAX-2200/PC, an XRD pattern was carried out on the cathode active material as shown in FIG. 6. Looking at the diffraction peaks of the sintered product, other than peaks corresponding to $LiFePO_4$ and $MnTiNb_2O_8$, there are no new peaks or features which is an indication that the LiFePO$_4$ and MnTiNb$_2$O$_8$ exist in two phases and that no new compounds are created. Accordingly, this demonstrates that the process described above provides a cathode active material having LiFePO$_4$/MnTiNb$_2$O$_8$/C in a mixed crystal form.

Example A2

Mix ZnO and Ta$_2$O$_5$ in a molar ratio of 1:1, grind the mixture in a ball mill for 5 hours, heat in an oxygen atmosphere at 15° C. per minute to 800° C. and continue sintering the product for 8 hours. Using the Rigaku D/MAX-2200/PC, an XRD pattern can be carried out on the resulting product. In comparison with the standard XRD pattern for ZnTa$_2$O$_6$, it was determined that the sintered product is ZnTa$_2$O$_6$.

Mix LiFePO$_4$ with the resulting ZnTa$_2$O$_6$ from above in a molar ratio of 1:0.03 with acetylene black as a source of carbon (amount of carbon capable of providing 0% by weight of carbon content in the final product). The LiFePO$_4$ can be prepared by mixing lithium oxalate, iron oxide and diammonium hydrogen phosphate in a Li:Fe:P molar ratio of 0.95:1:1, which can be added to the ZnTa$_2$O$_6$ at a diammonium hydrogen phosphate to ZnTa$_2$O$_6$ molar ratio of 1:0.03 (taking into account the phosphorous components in the mixture). Alternatively, the LiFePO$_4$ can be prepared by other lithium, iron and phosphate sources or by a third party.

Grind the mixture in a ball mill for 10 hours, remove and dry at 80° C. Heat the resulting powder in a nitrogen or argon atmosphere at 5° C. per minute to 500° C., continue sintering the product for 30 hours to provide a LiFePO$_4$/ZnTa$_2$O$_6$ mixed crystal cathode active material.

Figure 7:
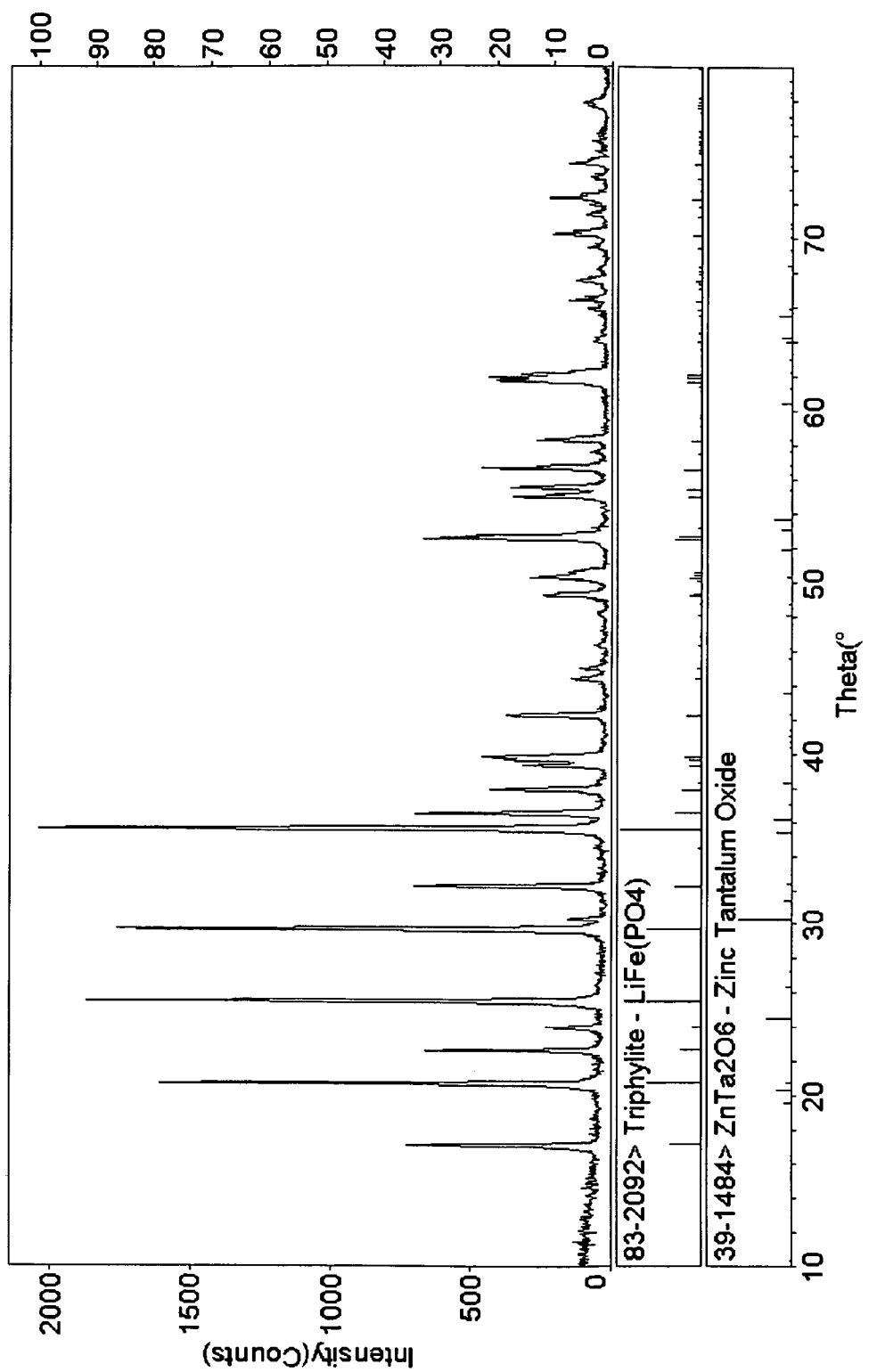
FIG. 7 illustrates the XRD pattern of a composite compound according to Example A2.

Using the Rigaku D/MAX-2200/PC, an XRD pattern was carried out on the cathode active material as shown in FIG. 7. Looking at the diffraction peaks of the sintered product, other than peaks corresponding to LiFePO$_4$ and ZnTa$_2$O$_6$, there are no new peaks or features which is an indication that the LiFePO$_4$ and ZnTa$_2$O$_6$ exist in two phases and that no new compounds are created. Accordingly, this demonstrates that the process described above provides a cathode active material having LiFePO$_4$/ZnTa$_2$O$_6$ in a mixed crystal form.

Example A3

Mix Y$_2$O$_3$, BaCO$_3$ and TiO$_2$ in a molar ratio of 0.5:3:2, grind the mixture in a ball mill for 5 hours, heat in a nitrogen atmosphere at 7° C. per minute to 1000° C. and continue sintering the product for 15 hours. Using the Rigaku D/MAX-2200/PC, an XRD pattern can be carried out on the resulting product. In comparison with the standard XRD pattern for YBa$_3$Ti$_2$O$_{8.5}$, it was determined that the sintered product is YBa$_3$Ti$_2$O$_{8.5}$.

Mix LiFePO$_4$ with the resulting YBa$_3$Ti$_2$O$_{8.5}$ from above in a molar ratio of 1:0.02 with carbon black as a source of carbon (amount of carbon capable of providing 2% by weight of carbon content in the final product). The LiFePO$_4$ can be prepared by mixing lithium hydroxide, ferrous carbonate and phosphoric acid in a Li:Fe:P molar ratio of 1.05:1:1.05, which can be added to the YBa$_3$Ti$_2$O$_{8.5}$ at a phosphoric acid to YBa$_3$Ti$_2$O$_{8.5}$ molar ratio of 1:0.02 (taking into account the phosphorous components in the mixture). Alternatively, the LiFePO$_4$ can be prepared by other lithium, iron and phosphate sources or by a third party.

Grind the mixture in a ball mill for 10 hours, remove and dry at 80° C. Heat the resulting powder in a nitrogen or argon atmosphere at 20° C. per minute to 800° C., continue sintering the product for 8 hours to provide a LiFePO$_4$/YBa$_3$Ti$_2$O$_{8.5}$/C mixed crystal cathode active material.

Figure 8:
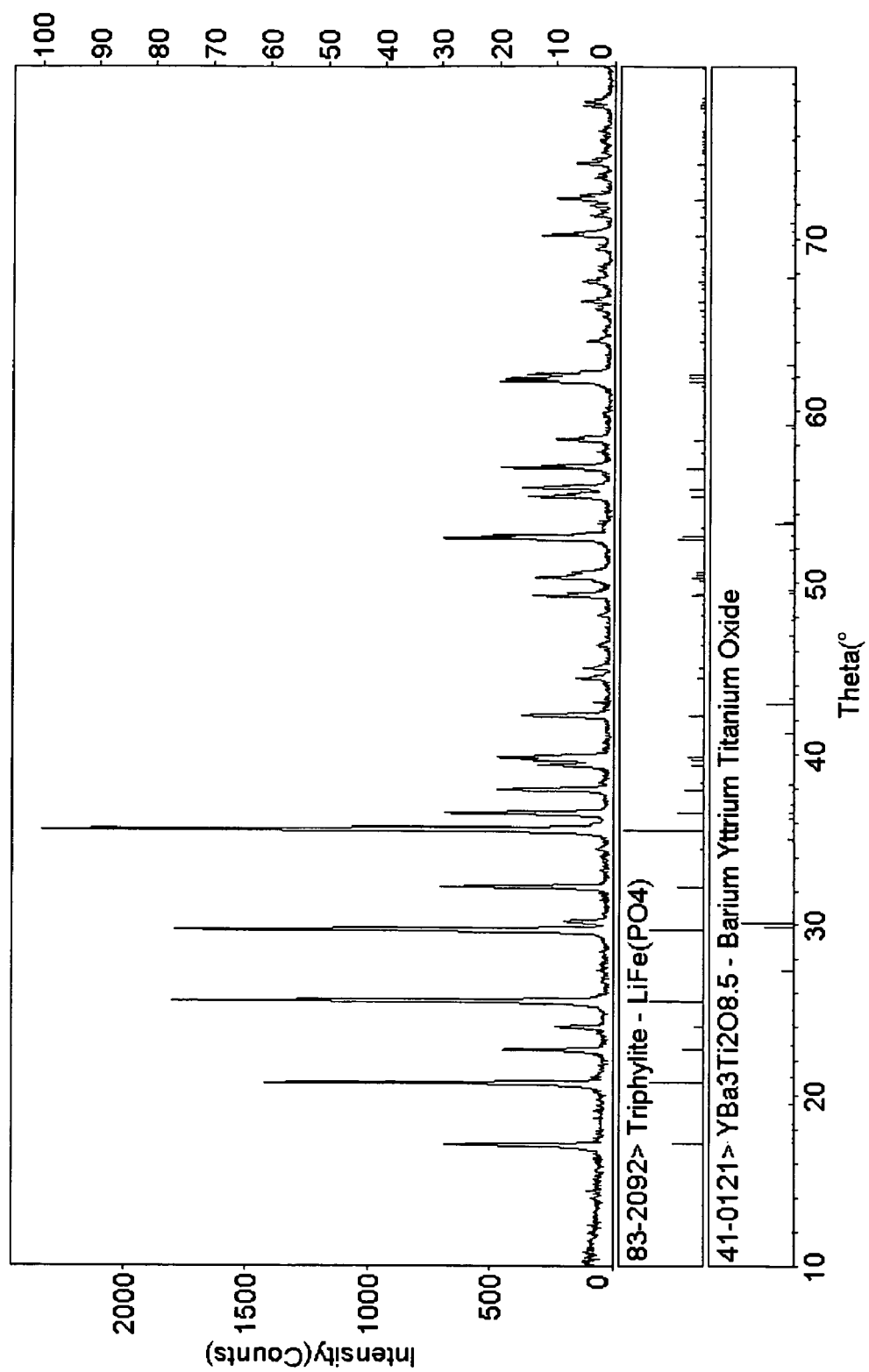
FIG. 8 illustrates the XRD pattern of a composite compound according to Example A3.

Using the Rigaku D/MAX-2200/PC, an XRD pattern was carried out on the cathode active material as shown in FIG. 8. Looking at the diffraction peaks of the sintered product, other than peaks corresponding to LiFePO$_4$ and YBa$_3$Ti$_2$O$_{8.5}$, there are no new peaks or features which is an indication that the LiFePO$_4$ and YBa$_3$Ti$_2$O$_{8.5}$ exist in two phases and that no new compounds are created. Accordingly, this demonstrates that the process described above provides a cathode active material having LiFePO$_4$/YBa$_3$Ti$_2$O$_{8.5}$/C in a mixed crystal form.

Example A4

Mix CuO, ZnO and Nb$_2$O$_5$ in a molar ratio of 0.85:0.15:1, grind the mixture in a ball mill for 5 hours, heat in a nitrogen atmosphere at 7° C. per minute to 1000° C. and continue sintering the product for 15 hours. Using the Rigaku D/MAX-2200/PC, an XRD pattern can be carried out on the resulting product. In comparison with the standard XRD pattern for Cu$_{0.85}$Zn$_{0.15}$Nb$_2$O$_6$, it was determined that the sintered product is Cu$_{0.85}$Zn$_{0.15}$Nb$_2$O$_6$.

The remaining steps incorporate those used in Example A1, with the difference being that the Cu$_{0.85}$Zn$_{0.15}$Nb$_2$O$_6$ is substituted in place of the MnTiNb$_2$O$_8$ to provide a LiFePO$_4$/Cu$_{0.85}$Zn$_{0.15}$Nb$_2$O$_6$/C mixed crystal cathode active material.

Figure 9:
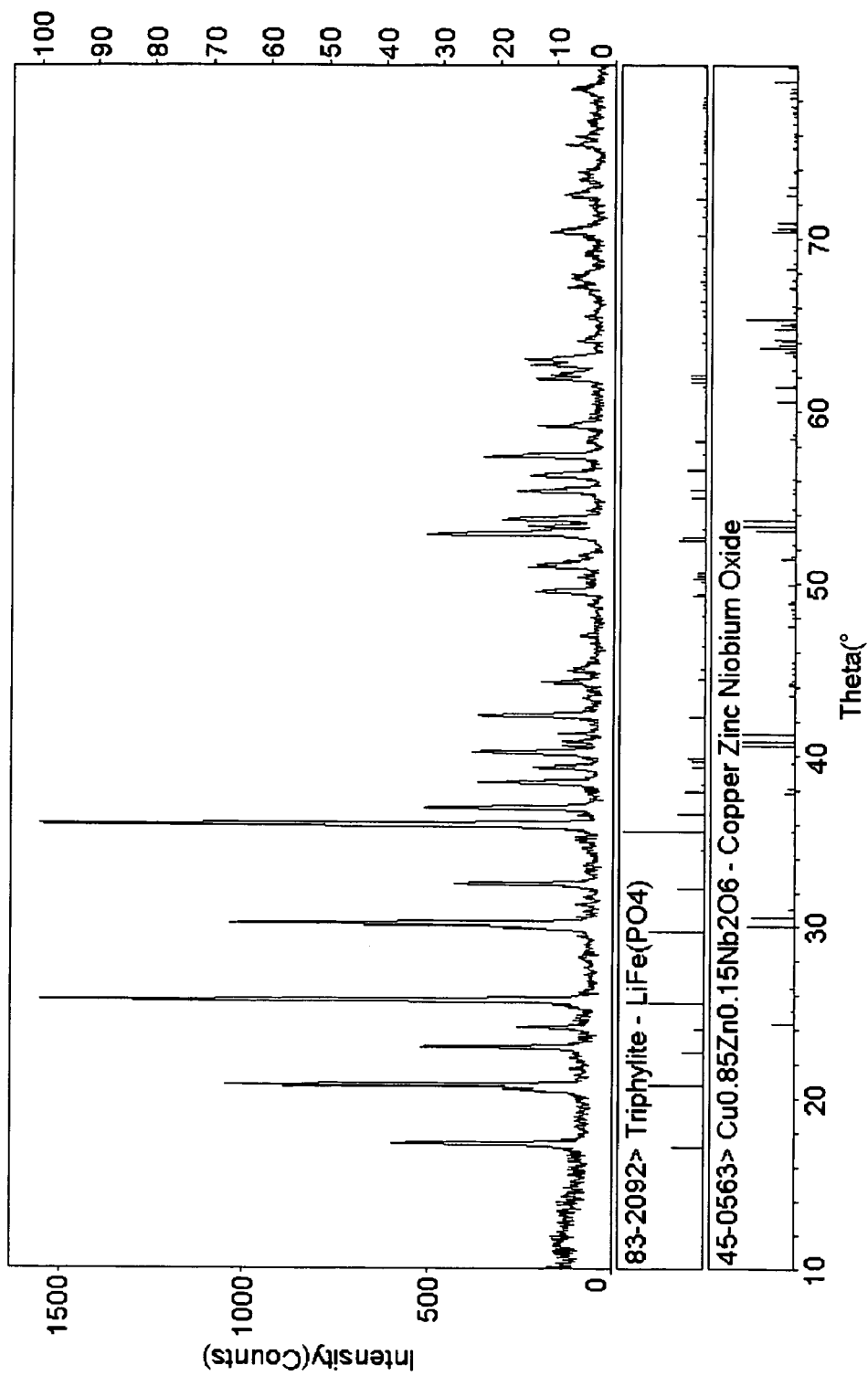
FIG. 9 illustrates the XRD pattern of a composite compound according to Example A4.

Using the Rigaku D/MAX-2200/PC, an XRD pattern was carried out on the cathode active material as shown in FIG. 9. Looking at the diffraction peaks of the sintered product, other than peaks corresponding to LiFePO$_4$ and Cu$_{0.85}$Zn$_{0.15}$Nb$_2$O$_6$, there are no new peaks or features which is an indication that the LiFePO$_4$ and Cu$_{0.85}$Zn$_{0.15}$Nb$_2$O$_6$ exist in two phases and that no new compounds are created. Accordingly, this demonstrates that the process described above provides a cathode active material having LiFePO$_4$/Cu$_{0.85}$Zn$_{0.15}$Nb$_2$O$_6$/C in a mixed crystal form.

Example A5

Mix ZrO$_2$, TiO$_2$ and SnO$_2$ in a molar ratio of 0.75:0.75:0.5, grind the mixture in a ball mill for 5 hours, heat in a nitrogen atmosphere at 7° C. per minute to 1000° C. and continue sintering the product for 15 hours. Using the Rigaku D/MAX-2200/PC, an XRD pattern can be carried out on the resulting product. In comparison with the standard XRD pattern for Zr$_{0.75}$Ti$_{0.75}$Sn$_{0.5}$O$_4$, it was determined that the sintered product is Zr$_{0.75}$Ti$_{0.75}$Sn$_{0.5}$O$_4$.

The remaining steps incorporate those used in Example A1, with the difference being that the Zr$_{0.75}$Ti$_{0.75}$Sn$_{0.5}$O$_4$ is substituted in place of the MnTiNb$_2$O$_8$ to provide LiFePO$_4$/Zr$_{0.75}$Ti$_{0.75}$Sn$_{0.5}$O$_4$/C mixed crystal cathode active material.

Figure 10:
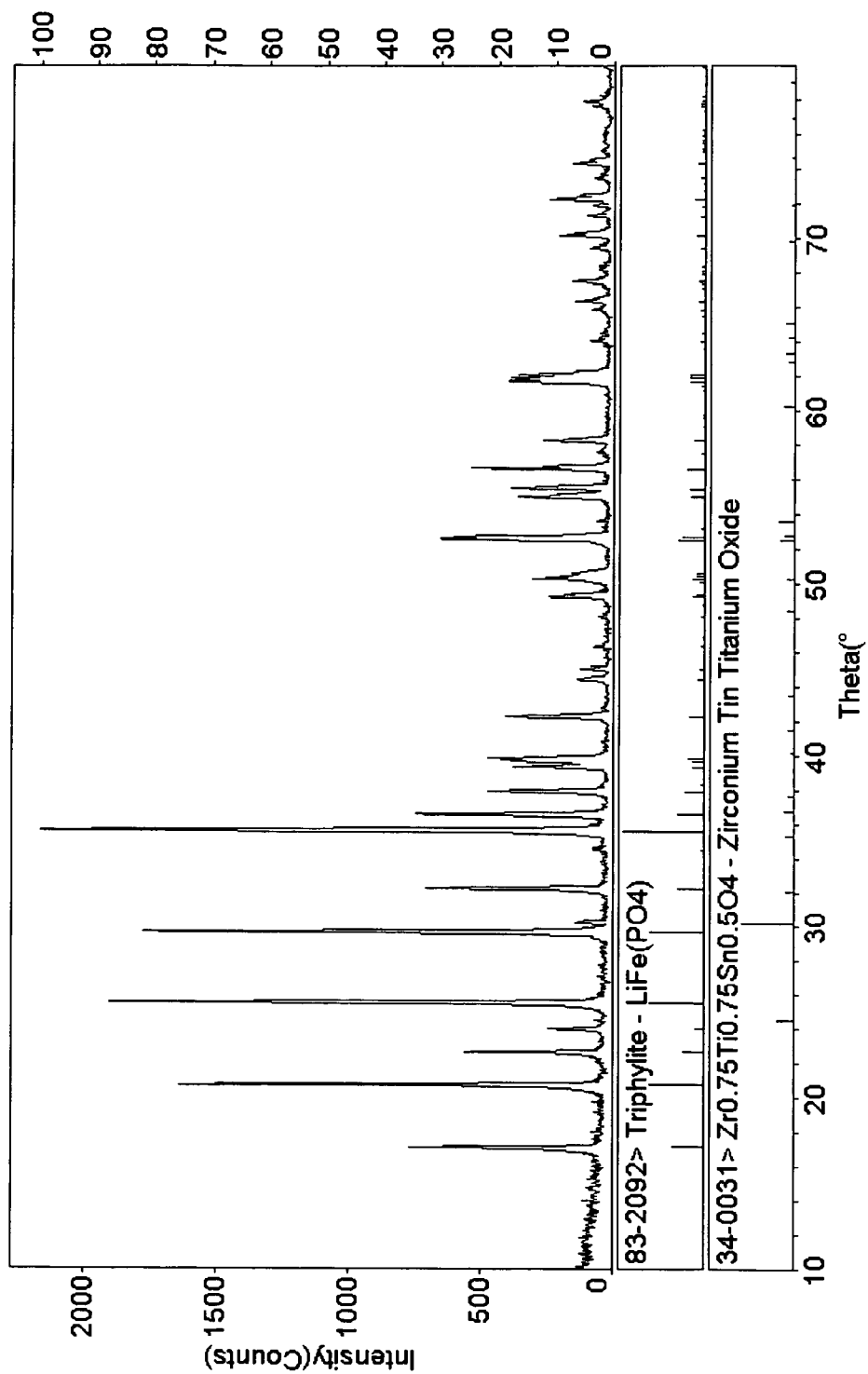
FIG. 10 illustrates the XRD pattern of a composite compound according to Example A5.

Using the Rigaku D/MAX-2200/PC, an XRD pattern was carried out on the cathode active material as shown in FIG. 10. Looking at the diffraction peaks of the sintered product, other than peaks corresponding to LiFePO$_4$ and Zr$_{0.75}$Ti$_{0.75}$Sn$_{0.5}$O$_4$, there are no new peaks or features which is an indication that the LiFePO$_4$ and Zr$_{0.75}$Ti$_{0.75}$Sn$_{0.5}$O$_4$ exist in two phases and that no new compounds are created. Accordingly, this demonstrates that the process described above provides a cathode active material having LiFePO$_4$/Zr$_{0.75}$Ti$_{0.75}$Sn$_{0.5}$O$_4$/C in a mixed crystal form.

Example A6

Mix FeO and WO$_3$ in a molar ratio of 1:1, grind the mixture in a ball mill for 5 hours, heat in an oxygen atmosphere at 15° C. per minute to 800° C. and continue sintering the product for 8 hours. Using the Rigaku D/MAX-2200/PC, an XRD pattern can be carried out on the resulting product. In comparison with the standard XRD pattern for FeWO$_4$, it was determined that the sintered product is FeWO$_4$.

The remaining steps incorporate those used in Example A1, with the difference being that the FeWO$_4$ is substituted in place of the MnTiNb$_2$O$_8$ to provide a LiFePO$_4$/FeWO$_4$/C mixed crystal cathode active material.

Figure 11:
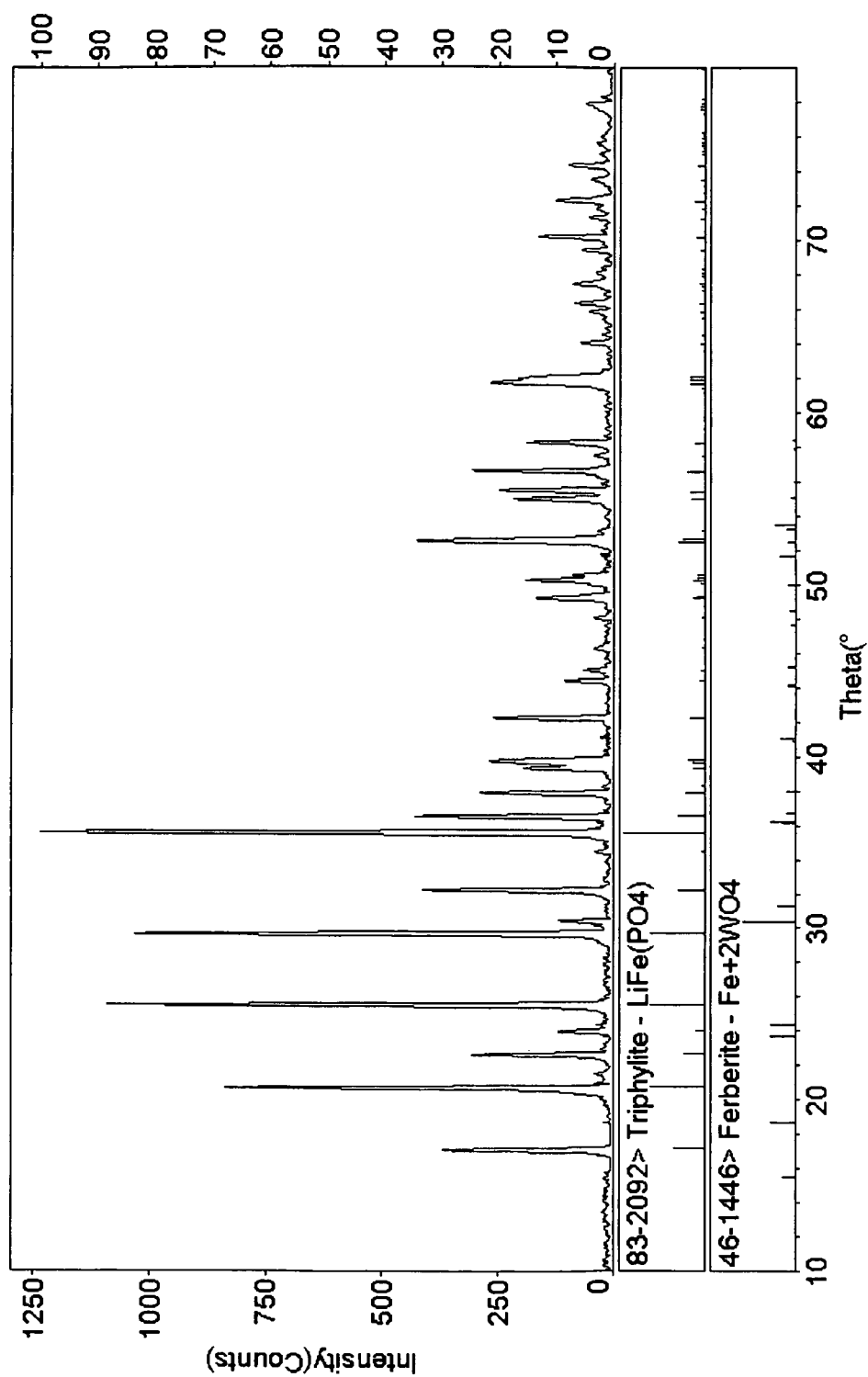
FIG. 11 illustrates the XRD pattern of a composite compound according to Example A6.

Using the Rigaku D/MAX-2200/PC, an XRD pattern was carried out on the cathode active material as shown in FIG. 11. Looking at the diffraction peaks of the sintered product, other than peaks corresponding to LiFePO$_4$ and FeWO$_4$, there are no new peaks or features which is an indication that the LiFePO$_4$ and FeWO$_4$ exist in two phases and that no new compounds are created. Accordingly, this demonstrates that the process described above provides a cathode active material having LiFePO$_4$/FeWO$_4$/C in a mixed crystal form.

Example A7

Mix ZnO and Al$_2$O$_3$ in a molar ratio of 2:1, grind the mixture in a ball mill for 5 hours, heat in an oxygen atmosphere at 15° C. per minute to 800° C. and continue sintering the product for 8 hours. Using the Rigaku D/MAX-2200/PC, an XRD pattern can be carried out on the resulting product. In comparison with the standard XRD pattern for ZnAlO$_2$, it was determined that the sintered product is ZnAlO$_2$.

The remaining steps incorporate those used in Example A1, with the difference being that the ZnAlO$_2$ is substituted in place of the MnTiNb$_2$O$_8$ to provide a LiFePO$_4$/ZnAlO$_2$/C mixed crystal cathode active material.

Using the Rigaku D/MAX-2200/PC, an XRD pattern was carried out on the cathode active material. Upon examination of the diffraction peaks of the sintered product, other than peaks corresponding to LiFePO$_4$ and ZnAlO$_2$, there are no new peaks or features which is an indication that the LiFePO$_4$ and ZnAlO$_2$ exist in two phases and that no new compounds are created. Accordingly, this demonstrates that the process described above provides a cathode active material having LiFePO$_4$/ZnAlO$_2$/C in a mixed crystal form.

Reference R1

Example B of U.S. Patent Application No. 2007/0207385 to provide a cathode material with LiFePO$_4$ to ZnAlO$_2$ molar ratio of 1:0.04 and carbon additive to provide a total carbon content of 5% by weight in the final product. The ZnAlO$_2$ and carbon additive are coated on the exterior surfaces of the LiFePO$_4$ to provide a cathode active material having LiFePO$_4$/ZnAlO$_2$/C.

Conductivity of Examples A1-A7 and Reference R1

At 25° C., separately take each cathode active materials of Examples A1-A7 and Reference R1, apply 30 MPa of pressure to provide a cylinder. Measure the height (l), diameter (d) and resistance (R) of each cylinder. Use the following formula to calculate the electrical conductivity ($\sigma$) for each sample:

Electrical conductivity $\sigma = 4l/(\pi R \times d^2)$

The electrical conductivities of Examples A1-A7 and Reference R1 are shown in Table 4.

TABLE 4

Electrical conductivities values of various samples at 25° C.

| Sample No. | Electrical conductivity of cathode active materials at 25° C. (S/cm) |
| --- | --- |
| Example A1 | 0.175 |
| Example A2 | 0.21 |
| Example A3 | 1.8 |
| Example A4 | 1.2 |

TABLE 4-continued

Electrical conductivities values of various samples at 25° C.

| Sample No. | Electrical conductivity of cathode active materials at 25° C. (S/cm) |
| --- | --- |
| Example A5 | 1.5 |
| Example A6 | 0.8 |
| Example A7 | 0.5 |
| Reference R1 | $2.6 \times 10^{-5}$ |

From Table 4, it can be observed that the cathode active materials of the present embodiments can achieve electrical conductivity up to 1.8 S/cm (Siemens per centimeter). In contrast, the cathode active material of Reference R1, obtained by known having ZnAlO$_2$ and carbon additives coated on the surfaces of LiFePO$_4$, achieved electrical conductivity of $2.6 \times 10^{-6}$ S/cm while the cathode active material of Example A7, having similar composition to that of Reference R1 but provided by the presently disclosed method, achieved electrical conductivity of 0.5 S/cm, the latter being 19,000 times more electrically conductive.

Testing of Examples A1-A7 and Reference R1

(1) Battery Preparation (a) Cathode Active Material

Separately combine 90 grams of each of the composite cathode material from Examples A1-A7 and Reference R1 with 5 grams of polyvinylidene fluoride (PVDF) binder and 5 grams of acetylene black to 50 grams of N-methylpyrrolidone (NMP). Place in a vacuum mixer to mix into a uniform slurry. Apply a coating of about 20 microns thick on both sides of an aluminum foil, dry at 150° C., roll and crop to a size of 540×43.5 mm$^2$ to provide about 5.2 grams of cathode active material.

(b) Anode Active Material

Combine 90 grams of natural graphite with 5 grams of polyvinylidene fluoride (PVDF) binder and 5 grams of conductive carbon black to 100 grams of N-methylpyrrolidone (NMP). Place in a vacuum mixer to mix into a uniform slurry. Apply a coating of about 12 microns thick to both sides of a copper foil, dry at 90° C., roll and crop to a size of 500×44 mm$^2$ to provide about 3.8 grams of anode active material.

(c) Battery Assembly

Separately wind each of the cathode and anode active materials with polypropylene film into a lithium secondary battery core, followed by dissolving one mole of LiPF$_6$ in a mixture of non-aqueous electrolyte solvent EC/EMC/DEC to provide a ratio of 1:1:1, inject and seal the electrolyte having a capacity of 3.8 g/Ah into the battery to provide separate lithium secondary batteries B1-B7 (Examples A1-A7) and BC1 (Reference R1) for testing.

Performance Testing of Batteries B1-B7 and BC1

Separately place each of batteries B1-B7 and BC1 on the testing cabinet. At 25° C., charge each battery at a current of 0.5 C with a voltage limit of 3.8 V and set the battery aside for 20 minutes. Using a current of 0.5 C, discharge the battery from 3.8 V to 2.5 V and record the discharge capacity as the battery's initial discharge capacity. Use the following equation to calculate the battery's specific discharge capacity. The test results for batteries B1-B7 and BC1 are shown in Table 5.

Specific discharge capacity=Initial discharge capacity (milliampere hour)/weight of cathode active material (grams)

Repeat the process described above: charge the battery, set it aside, and discharge each battery for 500 cycles. Record the battery's discharge capacity and use the following equation to calculate the battery's ability to maintain discharge capacity after 500 cycles. The higher the maintenance rate, the better the performance of the battery in maintaining its discharge capacity. The test results for batteries B1-B7 and BC1 are shown in Table 5.

Capacity maintenance rate=(Discharge capacity after nth cycle/initial discharge capacity)×100%

TABLE 5

Electrical testing results for batteries B1-B7 and BC1.

| Sample No. | Specific Discharge Capacity (mAh/g at 0.5 C) | Capacity Maintenance Rate after 500 Cycles |
|---|---|---|
| Example A1/Battery B1 | 123 | 95.21% |
| Example A2/Battery B2 | 124 | 95.87% |
| Example A3/Battery B3 | 135 | 98.87% |
| Example A4/Battery B4 | 131 | 97.56% |
| Example A5/Battery B5 | 133 | 98.50% |
| Example A6/Battery B6 | 128 | 97.05% |
| Example A7/Battery B7 | 126 | 96.44% |
| Reference R1/Battery BC1 | 112 | 90.12% |

From the data in Table 5, it can be observed that the cathode active materials according to Examples A1-A7 of the presently disclosed invention are able to achieve better electrical performance than Reference R1. Specifically, the cathode active materials of batteries B1-B7 are able to achieve specific discharge capacity of at least 123 mAh/g at 0.5 C and maintain greater than 95% discharge capacity after 500 cycles. Additionally, the cathode active material of Reference R1 achieved specific discharge capacity of 112 mAh/g and maintained 90.12% discharge capacity after 500 cycles while cathode active material of Example A7, having similar composition to that of Reference R1 but provided by the presently disclosed method, achieved specific discharge capacity of 126 mAh/g and maintained 96.44% discharge capacity after 500 cycles. Accordingly, the cathode active materials for lithium secondary batteries and methods of manufacturing such according to the presently disclosed embodiments are able to provide superior electrical performance, e.g., higher electrical conductivity, discharge capacity and discharge capacity maintenance or retention rate.

Although the invention has been described in detail with reference to several embodiments, additional variations and modifications exist within the scope and spirit of the invention as described and defined in the following claims.

What is claimed is:

1. A cathode active material comprising a mixed crystal, the mixed crystal having: a first crystalline substance having one or more members with the general formulas $Li_xM_y(XO_4)_z$, $LiMXO_5$, $LiMXO_6$ and $LiMX_2O_7$, wherein:
   $0<x/z\leq1$ and $0\leq y/z\leq1$;
   M is selected from elements Na, Mn, Fe, Co, Ni, Ti, Nb and V;
   X is selected from elements P, S, As, Mo and W; and
   a second crystalline substance having one or more members with the general formula $A_aM_bN_cO_d$, wherein:
   A, M and N are different metals selected from groups IIA, IIIA, IVA, VA, IB, IIB, IIIB, IVB, VB, VIIB, VIIB and VIII of the periodic table;
   $0\leq a\leq 6$, $0<b\leq 6$, $0<c\leq 6$ and $0<d\leq 12$;
   wherein a and b cannot both be 0 at the same time, wherein the first crystalline substance has a lattice, and at least a part of the second crystalline substance is received by and distributed in the lattice of the first crystalline structure, wherein the first crystalline substance and the second crystalline substance has molar ratios of about 1 to 0.01-0.05, and wherein the cathode active material has an electrical conductivity of about 0.01 to 10 S/cm at about 25° C.

2. The material of claim 1, wherein the first crystalline substance includes one or more members selected from the group consisting of $LiFePO_4$, $LiMnPO_4$, $LiCoPO_4$, $Li_3Fe_2(PO_4)_3$, $LiTi_2(PO_4)_3$, $Li_3V_2(PO_4)_3$, $Li_2NaV_2(PO_4)_3$, $LiTiPO_5$, $LiVMoO_6$, $LiVWO6$, $LiVP_2O_7$ and $LiFeAs_2O_7$; and wherein the second crystalline substance includes one or more members selected from the group consisting of $Bi_4Ti_3O_{12}$, $CuNb_2O_6$, $MnTaO_4$, $FeWO_4$, $ZnZrNb_2O_8$, $NiNb_2O_6$, $NiZrNb_2O_8$, $FeTiNb_2O_8$, $MnTiNb_2O_8$, $MgSnNb_2O_8$, $ZnTa_2O_6$, $Cu_{0.85}Zn_{0.15}Nb_2O_6$, $YBa_3Ti_2O_{8.5}$, $Zr_{0.75}Ti_{0.75}Sn_{0.5}O_4$, $HfTiO_4$ and $MgNb_2O_6$.

3. The material of claim 1, further comprising a carbon additive, wherein the carbon additive is capable of providing the mixed crystal with about 1-5% of carbon by weight.

4. The material of claim 3, wherein the carbon additive includes one or more members selected from the group consisting of carbon black, acetylene black, graphite, glucose, sucrose, citric acid, starch, dextrin and polyethylene glycol.

5. A lithium ion secondary battery comprising a battery case, electrodes and electrolyte, the electrodes and electrolyte being sealed within the battery case, the electrodes having wounded or stacked cathode, anode and divider film, the cathode further comprising the cathode material of claim 1.

6. A cathode active material comprising a mixed crystal, the mixed crystal having:
   a first crystalline substance having a combination of lithium, iron and phosphorous sources, wherein the lithium, iron and phosphorous (Li:Fe:P) sources have molar ratios of about 0.95-1.1:1:0.95-1.1; and
   a second crystalline substance having one or more members with the general formula $A_aMbN_cO_d$, wherein:
   A, M and N are different metals selected from groups IIA, IIIA, IVA, VA, IB, IIB, IIIB, IVB, VB, VIIB, VIIB and VIII of the periodic table;
   $0\leq a\leq 6$, $0<b\leq 6$, $0<c\leq 6$ and $0<d\leq 12$;
   wherein a and b cannot both be 0 at the same time, wherein the first crystalline substance has a lattice, and at least a part of the second crystalline substance is received by and distributed in the lattice of the first crystalline structure, wherein the phosphorous source and the second crystalline substance has molar ratios of about 1 to 0.01-0.05, taking only the phosphorous source in the material into consideration, and wherein the cathode active material has an electrical conductivity of about 0.01 to 10 S/cm at about 25° C.

7. The material of claim 6, wherein the second crystalline substance includes one or more members selected from the group consisting of $Bi_4Ti_3O_{12}$, $CuNb_2O_6$, $MnTaO_4$, $FeWO_4$, $ZnZrNb_2O_8$, $NiNb_2O_6$, $NiZrNb_2O_8$, $FeTiNb_2O_8$, $MnTiNb_2O_8$, $MgSnNb_2O_8$, $ZnTa_2O_6$, $Cu_{0.85}Zn_{0.15}Nb_2O_6$, $YBa_3Ti_2O_{8.5}$, $Zr_{0.75}Ti_{0.75}Sn_{0.5}O_4$, $HfTiO_4$ and $MgNb_2O_6$.

8. The material of claim 6, wherein the lithium source includes one or more members selected from the group consisting of lithium carbonate, lithium hydroxide, lithium oxalate and lithium acetate; the iron source includes one or more members selected from the group consisting of ferrous oxalate, ferrous carbonate, iron acetate, iron oxide, iron phosphate, iron pyrophosphate and iron nitrate; and the phosphate source includes one or more members selected from the group consisting of ammonium phosphate, ammonium dihydrogen phosphate, ammonium, iron phosphate, phosphoric acid and lithium dihydrogen phosphate.

9. The material of claim 6, further comprising a carbon additive, wherein the carbon additive is capable of providing the mixed crystal with about 1-5% of carbon by weight.

10. The material of claim 9, wherein the carbon additive includes one or more members selected from the group consisting of carbon black, acetylene black, graphite, glucose, sucrose, citric acid, starch, dextrin and polyethylene glycol.

11. A lithium ion secondary battery comprising a battery case, electrodes and electrolyte, the electrodes and electrolyte being sealed within the battery case, the electrodes having wounded or stacked cathode, anode and divider film, the cathode further comprising the cathode material of claim 6.

12. A cathode active material comprising a mixed crystal, the mixed crystal having:
   a first crystalline substance having one or more members selected from the group consisting of $LiFePO_4$, $LiMnPO_4$, $LiCoPO_4$, $Li_3Fe_2(PO_4)_3$, $LiTi_2(PO_4)_3$, $Li_3V_2(PO_4)_3$, $Li_2NaV_2(PO_4)_3$, $LiTiPO_5$, $LiVMoO_6$, $LiVWO6$, $LiVP_2O_7$ and $LiFeAs_2O_7$; and
   a second crystalline substance having one or more members selected from the group consisting of $Bi_4Ti_3O_{12}$, $CuNb_2O_6$, $MnTaO_4$, $FeWO_4$, $ZnZrNb_2O_8$, $NiNb_2O_6$, $NiZrNb_2O_8$, $FeTiNb_2O_8$, $MnTiNb_2O_8$, $MgSnNb_2O_8$, $ZnTa_2O_6$, $Cu_{0.85}Zn_{0.15}Nb_2O_6$, $YBa_3Ti_2O_{8.5}$, $Zr_{0.75}Ti_{0.75}Sn_{0.5}O_4$, $HfTiO_4$ and $MgNb_2O_6$, wherein the first crystalline substance has a lattice, and at least a part of the second crystalline substance is received by and distributed in the lattice of the first crystalline structure, wherein the first crystalline substance and the second crystalline substance has molar ratios of about 1 to 0.01-0.05, and wherein the cathode active material has an electrical conductivity of about 0.01 to 10 S/cm at about 25° C.

13. The material of claim 12, further comprising a carbon additive, wherein the carbon additive is capable of providing the mixed crystal with about 1-5% of carbon by weight.

14. The material of claim 13, wherein the carbon additive includes one or more members selected from the group consisting of carbon black, acetylene black, graphite, glucose, sucrose, citric acid, starch, dextrin and polyethylene glycol.

15. A lithium ion secondary battery comprising a battery case, electrodes and electrolyte, the electrodes and electrolyte being sealed within the battery case, the electrodes having wounded or stacked cathode, anode and divider film, the cathode further comprising the cathode material of claim 12.

* * * * *